(12) United States Patent
Shimada et al.

(10) Patent No.: US 6,824,903 B2
(45) Date of Patent: Nov. 30, 2004

(54) HYDROGEN SUPPLYING DEVICE FOR FUEL CELL

(75) Inventors: Toshiaki Shimada, Utsunomiya (JP); Takahiro Kuriiwa, Utsunomiya (JP); Yoshio Nuiya, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 332 days.

(21) Appl. No.: 10/081,634

(22) Filed: Feb. 21, 2002

(65) Prior Publication Data

US 2002/0119355 A1 Aug. 29, 2002

(30) Foreign Application Priority Data

Feb. 23, 2001 (JP) .................................... P2001-048574

(51) Int. Cl.[7] ............................ H01M 8/04; H01M 8/06
(52) U.S. Cl. ............................ 429/20; 429/22; 429/24; 429/26
(58) Field of Search .............................. 429/20, 22, 24, 429/26

(56) References Cited

U.S. PATENT DOCUMENTS

| | | | | |
|---|---|---|---|---|
| 5,229,222 A | * | 7/1993 | Tsutsumi et al. | 429/19 |
| 5,366,820 A | * | 11/1994 | Tsutsumi et al. | 429/19 |
| 6,459,231 B1 | * | 10/2002 | Kagatani | 320/101 |
| 6,468,681 B1 | * | 10/2002 | Horiguchi | 429/26 |
| 2002/0025460 A1 | * | 2/2002 | Horiguchi et al. | 429/13 |
| 2002/0045079 A1 | * | 4/2002 | Shimada et al. | 429/20 |
| 2003/0077489 A1 | * | 4/2003 | Sahoda | 429/19 |

FOREIGN PATENT DOCUMENTS

| | | |
|---|---|---|
| JP | 09-142803 | 6/1997 |
| JP | 2000-088196 | 3/2000 |

* cited by examiner

*Primary Examiner*—Hoa Van Le
(74) *Attorney, Agent, or Firm*—Lahive & Cockfield, LLP; Anthony A. Laurentano, Esq.

(57) ABSTRACT

A hydrogen supplying device for a fuel cell includes a hydrogen occlusion tank in which a hydrogen occlusion alloy is contained, the hydrogen occlusion alloy being capable of occluding and discharging hydrogen which is used as fuel for a fuel cell; a hydrogen tank in which hydrogen to be supplied to the fuel cell can be stored in a compressed state; a heating unit which supplies heat to the hydrogen occlusion tank; a hydrogen supply line through which a flow of hydrogen supplied from the hydrogen occlusion tank and a flow of hydrogen supplied from the hydrogen tank can be merged to be supplied to the fuel cell; and a flow rate controlling device which controls a flow rate of hydrogen supplied from the hydrogen occlusion tank and/or a flow rate of hydrogen supplied from the hydrogen tank.

14 Claims, 13 Drawing Sheets

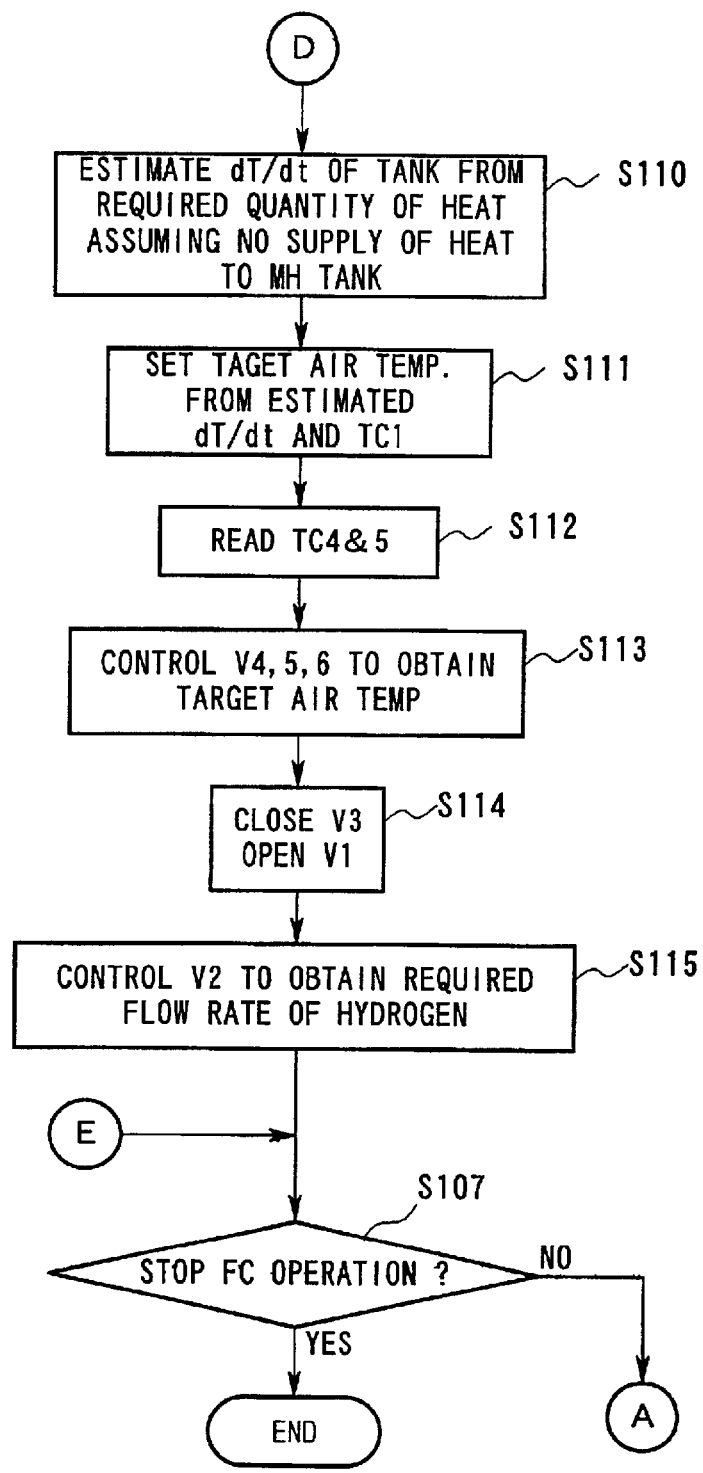

HYDROGEN SUPPLYING DEVICE FOR FUEL CELL

BACKGROUND OF THE INVENTION

1. Field of the Invention

The present invention relates to a hydrogen supplying device for a fuel cell which supplies hydrogen, as a fuel, to a fuel cell. In particular, the present invention relates to a hydrogen supplying device for a fuel cell provided with a hydrogen occlusion tank containing a hydrogen occlusion alloy and a hydrogen tank in which hydrogen may be stored in a compressed state.

2. Description of the Related Art

As a hydrogen supplying device which supplies hydrogen to a fuel cell mounted on a movable object, such as a vehicle, one which supplies hydrogen discharged from a hydrogen occlusion alloy, in which hydrogen has been occluded, to a fuel cell, has been known as disclosed in, for example, Japanese Unexamined Patent Application, First Publication No. 2000-88196.

When hydrogen is occluded in or discharged from the hydrogen occlusion alloys, heat is associated with the process. That is, it is necessary to remove heat from the hydrogen occlusion alloy when occluding hydrogen, and to supply heat to the hydrogen occlusion alloy when discharging hydrogen. Since the quantity of heat required for discharging hydrogen is supplied from the heat capacity of the hydrogen occlusion alloy, the temperature of the hydrogen occlusion alloy decreases, if no heat is externally supplied, when hydrogen is discharged.

Accordingly, the above-mentioned type hydrogen supplying devices are provided with a heating means for applying heat to the hydrogen occlusion alloy so that hydrogen may be stably discharged from the hydrogen occlusion alloy. The heating means recovers heat which is generated when power is generated by a fuel cell, and utilizes this waste heat as a heating source. At this time, a liquid, such as water, or a gas, such as air, is used as a heating medium.

In the conventional hydrogen supplying device for a fuel cell, however, the quantity of heat, which can be supplied by the heating means, may be insufficient, depending on the conditions under which the fuel cell is operated, for the quantity of heat required by the hydrogen occlusion alloy, even if the hydrogen supplying device is provided with the above-mentioned heating device. For this reason, in some cases, the temperature of the hydrogen occlusion alloy decreases during an operation, and it becomes difficult to supply the required amount of hydrogen to the fuel cell from the hydrogen occlusion alloy.

SUMMARY OF THE INVENTION

Accordingly, it is an object of the present invention to provide a hydrogen supplying device for a fuel cell provided with a hydrogen occlusion tank containing a hydrogen occlusion alloy and a hydrogen tank in which hydrogen is stored in a compressed state, which is capable of always stably supplying an amount of hydrogen required by the fuel cell by controlling an amount of hydrogen supplied from the hydrogen occlusion tank and from the hydrogen tank.

In order to solve the above problems, the first aspect of the present invention is a hydrogen supplying device for a fuel cell including: a hydrogen occlusion tank (for example, the hydrogen occlusion tank 1 used in the first through third embodiments which will be described later) in which a hydrogen occlusion alloy is contained, the hydrogen occlusion alloy being capable of occluding and discharging hydrogen which is used as a fuel for a fuel cell (for example, the fuel cell 7 used in the first through third embodiments which will be described later); a hydrogen tank (for example, the hydrogen tank 19 used in the first through third embodiments which will be described later) in which hydrogen to be supplied to the fuel cell can be stored in a compressed state; a heating unit (for example, the duct 3, the junction duct 21, outside air duct 23, the cold air duct 25, the heat exchange tube 5, and the flow rate controlling valves V4, V5, and V6 used in the first through third embodiments which will be described later) which supplies heat to the hydrogen occlusion tank; a hydrogen supply line (for example, the hydrogen supply lines 9, 11, 13, and 17 used in the first through third embodiments which will be described later) through which a flow of hydrogen supplied from the hydrogen occlusion tank and a flow of hydrogen supplied from the hydrogen tank can be merged to be supplied to the fuel cell; and a flow rate controlling device (for example, the flow rate controlling valves V1, V2, and V3 used in the first through third embodiments which will be described later) which controls a flow rate of hydrogen supplied from the hydrogen occlusion tank and/or a flow rate of hydrogen supplied from the hydrogen tank.

According to the hydrogen supplying device for a fuel cell having the above mentioned configuration, it becomes possible to supply hydrogen to the fuel cell only from the hydrogen occlusion tank while applying heat to the hydrogen occlusion tank by controlling the flow rate of hydrogen by the flow rate controlling device. Also, it becomes possible to supply hydrogen to the fuel cell only from the hydrogen tank, or from both the hydrogen occlusion tank and the hydrogen tank by merging the flow of hydrogen from the two. Accordingly, the flow rate of hydrogen may be controlled taking into account the heating state of hydrogen occlusion tank by the heating unit.

According to the second aspect of the present invention, in accordance with the first aspect of the invention, the flow rate controlling device controls the flow rate of hydrogen supplied from the hydrogen occlusion tank and/or the flow rate of hydrogen supplied from the hydrogen tank depending on the temperature of the hydrogen occlusion tank.

According to the hydrogen supplying device for a fuel cell having the above mentioned configuration, it becomes possible to control the flow rate of hydrogen discharged from the hydrogen occlusion tank and the flow rate of hydrogen discharged from the hydrogen tank to be most suitable depending on the temperature of the hydrogen occlusion tank. Accordingly, it becomes possible to stably supply hydrogen to the fuel cell.

According to the third aspect of the present invention, in accordance with the second aspect of the invention, a supply of hydrogen to the fuel cell from the hydrogen occlusion tank is stopped and hydrogen is supplied to the fuel cell only from the hydrogen tank when the temperature of the hydrogen occlusion tank is lower than a lower limit temperature (for example, the lower limit value t1 in the first through third embodiments which will be described later), and hydrogen is supplied to the fuel cell from the hydrogen occlusion tank when the temperature of the hydrogen occlusion tank is equal to or higher than the lower limit temperature.

According to the hydrogen supplying device for a fuel cell having the above mentioned configuration, it becomes possible to supply hydrogen to the fuel cell from the hydrogen tank when the temperature of the hydrogen occlusion tank is lower than the lower limit temperature at which the amount of hydrogen discharged from the hydrogen occlusion tank is decreased. Accordingly, a supply of hydrogen to the fuel cell may be performed in a stable manner even when the supply from the hydrogen occlusion tank is difficult.

According to the fourth aspect of the present invention, in accordance with the second aspect of the invention, a supply of hydrogen to the fuel cell from the hydrogen is stopped and hydrogen is supplied to the fuel cell only from the hydrogen occlusion tank when the temperature of the hydrogen occlusion tank is higher than an upper limit temperature (for example, the upper limit value t2 in the first or third embodiment which will be described later).

According to the hydrogen supplying device for a fuel cell having the above mentioned configuration, the amount of hydrogen discharged from the hydrogen occlusion tank is increased and it becomes possible to prevent an increase in the temperature of the hydrogen occlusion tank. Accordingly, an increase in the pressure in the hydrogen occlusion tank may also be prevented.

According to the fifth aspect of the present invention, in accordance with the second aspect of the invention, the flow rate controlling device is controlled depending on a rate of change in the temperature (for example, the rate of change in temperature dT/dt in the first or third embodiments which will be described later) of the hydrogen occlusion tank when the temperature of the hydrogen occlusion tank is equal to or higher than a lower limit temperature (for example, the lower limit value t1 in the first through third embodiments which will be described later) and is equal to or lower than a higher limit temperature (for example, the lower limit value t2 in the first or third embodiment which will be described later).

According to the hydrogen supplying device for a fuel cell having the above mentioned configuration, it becomes possible to control the flow rate ratio of the flow rate of hydrogen discharged from the hydrogen occlusion tank to the flow rate of hydrogen discharged from the hydrogen tank to be most suitable depending on the rate of change in the temperature of the hydrogen occlusion tank. Accordingly, the temperature of the hydrogen occlusion tank may be controlled to be a desirable temperature.

According to the sixth aspect of the present invention, in accordance with the fifth aspect of the invention, the flow rate controlling device is controlled so that a supply of hydrogen to the fuel cell from the hydrogen tank is stopped and hydrogen is supplied to the fuel cell only from the hydrogen occlusion tank when the rate of change in the temperature of the hydrogen occlusion tank is increasing, and the flow rate controlling device is controlled so that hydrogen is supplied to the fuel cell from both the hydrogen occlusion tank and the hydrogen tank when the rate of change in the temperature of the hydrogen occlusion tank is decreasing.

According to the hydrogen supplying device for a fuel cell having the above mentioned configuration, it becomes possible to prevent an increase and a decrease in the temperature of the hydrogen occlusion tank while maintaining a stable supply of hydrogen to the fuel cell. Accordingly, both the stable supply of hydrogen to the fuel cell and the proper control of the temperature of the hydrogen occlusion tank may be realized at the same time.

According to the seventh aspect of the present invention, in accordance with the first aspect of the invention, the flow rate controlling device is controlled depending on the rate of change in the temperature (for example, the rate of change in temperature dT/dt in the first through third embodiments which will be described later) of the hydrogen occlusion tank.

According to the hydrogen supplying device for a fuel cell having the above mentioned configuration, it becomes possible to control the flow rate of hydrogen discharged from the hydrogen occlusion tank and from the hydrogen tank to be most suitable in accordance with the rate of change in the temperature of the hydrogen occlusion tank. Accordingly, the temperature of the hydrogen occlusion tank may quickly reach a desired temperature.

According to the eighth aspect of the present invention, in accordance with the seventh aspect of the invention, the flow rate controlling device controls so that the rate of change in temperature of the hydrogen occlusion tank becomes substantially zero (i.e., dT/dt=0 as in the third embodiment which will be described later).

According to the hydrogen supplying device for a fuel cell having the above mentioned configuration, it becomes possible to control the temperature of the hydrogen occlusion tank to be a constant temperature.

According to the ninth aspect of the present invention, in accordance with the first aspect of the invention, the flow rate controlling device is controlled depending on the temperature of the hydrogen occlusion tank and the rate of change in the temperature of the hydrogen occlusion tank.

According to the hydrogen supplying device for a fuel cell having the above mentioned configuration, it becomes possible to control the flow rate of hydrogen discharged from the hydrogen occlusion tank and from the hydrogen tank to be most suitable depending on the temperature of the hydrogen occlusion tank and the rate of change in the temperature of the hydrogen occlusion tank. Accordingly, it becomes possible to supply hydrogen to the fuel cell in a stable manner while controlling the temperature of the hydrogen occlusion tank to be a desired temperature.

According to the tenth embodiment of the present invention, a hydrogen supplying device for a fuel cell is provided which includes a hydrogen occlusion tank (for example, the hydrogen occlusion tank 1 used in the third embodiment which will be described later) in which a hydrogen occlusion alloy is contained, the hydrogen occlusion alloy being capable of occluding and discharging hydrogen which is used as a fuel for a fuel cell (for example, the fuel cell 7 used in the third embodiment which will be described later); a hydrogen tank (for example, the hydrogen tank 19 used in the third embodiment which will be described later) in which hydrogen to be supplied to the fuel cell can be stored in a compressed state; a heating unit (for example, the duct 3, the junction duct 21, outside air duct 23, the cold air duct 25, the heat exchange tube 5, and the flow rate controlling valves V4, V5, and V6 used in the third embodiment which will be described later) which supplies heat to the hydrogen occlusion tank; a hydrogen supply line (for example, the hydrogen supply lines 9, 11, 13, and 17 used in the first through third embodiments which will be described later) through which a flow of hydrogen supplied from the hydrogen occlusion tank and a flow of hydrogen supplied from the hydrogen tank can be merged to be supplied to the fuel cell; and a flow rate controlling device (for example, the flow rate controlling valve V3 used in the third embodiment which will be described later) which controls a flow rate of hydrogen supplied from the hydrogen tank depending on a flow rate of hydrogen supplied from the hydrogen occlusion tank, the flow rate of hydrogen from the hydrogen occlusion tank being controlled by heat supplied from the heating unit.

According to the hydrogen supplying device for a fuel cell having the above mentioned configuration, it becomes possible to control the amount of hydrogen discharged from the hydrogen tank to be most suitable depending on the amount of hydrogen discharged from the hydrogen occlusion tank.

According to the eleventh aspect of the present invention, in accordance with the tenth aspect of the invention, the flow rate controlling device controls the flow rate of hydrogen supplied from the hydrogen tank so that the total of the flow rate of hydrogen supplied from the hydrogen occlusion tank and the flow rate of hydrogen supplied from the hydrogen tank becomes a flow rate of hydrogen required by the fuel cell.

According to the hydrogen supplying device for a fuel cell having the above mentioned configuration, it becomes possible to supply hydrogen to the fuel cell without excess or deficiency.

According to the twelfth aspect of the present invention, in accordance with the eleventh aspect of the invention, the hydrogen supplying device for a fuel cell further includes a quantity of heat calculation unit (for example, step S317 in the third embodiment which will be described later) which calculates a quantity of heat for heating the hydrogen occlusion tank by the heating unit; and a maximum discharging amount of hydrogen calculation unit (for example, step S325 in the third embodiment which will be described later) which calculates a maximum amount of hydrogen that can be supplied from the hydrogen occlusion tank, based on the quantity of heat for heating the hydrogen occlusion tank calculated by the quantity of heat calculation unit, wherein the flow rate controlling device controls the flow rate of hydrogen supplied from the hydrogen tank depending on the maximum discharging amount of hydrogen calculated by the maximum discharging amount of hydrogen calculation unit.

According to the hydrogen supplying device for a fuel cell having the above mentioned configuration, since the maximum discharging amount of hydrogen is discharged from the hydrogen occlusion tank, it becomes possible to control the temperature of the hydrogen occlusion tank so as not to be changed and to supply an amount of hydrogen required by the fuel cell.

According to the thirteenth aspect of the present invention, in accordance with the twelfth aspect of the invention, the flow rate controlling device controls so that hydrogen is not supplied from the hydrogen tank if the maximum discharging amount of hydrogen calculated by the maximum discharging amount of hydrogen calculation unit is sufficient for the flow rate of hydrogen required by the fuel cell.

According to the hydrogen supplying device for a fuel cell having the above mentioned configuration, it becomes possible to decrease the consumption of hydrogen in the hydrogen tank, and hence the capacity or the size of the hydrogen tank may be decreased.

According to the fourteenth aspect of the present invention, a hydrogen supplying device for a fuel cell is provided which includes a hydrogen occlusion tank (for example, the hydrogen occlusion tank 1 used in the first or third embodiment which will be described later) in which a hydrogen occlusion alloy is contained, the hydrogen occlusion alloy being capable of occluding and discharging hydrogen which is used as a fuel for the fuel cell; a heating unit (for example, the duct 3, the junction duct 21, the outside air duct 23, the cold air duct 25, the heat exchange tube 5, and the flow rate controlling valves V4, V5, and V6 used in the first or third embodiment which will be described later) which is used for heating the hydrogen occlusion tank by supplying a heating medium (for example, air used in the first or third embodiment which will be described later) which has been heated by using a waste heat from the fuel cell and whose temperature is controllable, to the hydrogen occlusion tank; and a required quantity of heat calculation unit (for example, step S108 or S308 in the first or third embodiment which will be described later) which calculates a quantity of heat required by the hydrogen occlusion tank based on an amount of hydrogen supplied from the hydrogen occlusion tank, wherein the heating unit is controlled depending on the required quantity of heat calculated by the required quantity of heat calculation unit.

According to the hydrogen supplying device for a fuel cell having the above mentioned configuration, it becomes possible to securely supply a required quantity of heat to the hydrogen occlusion tank from the heating unit. Accordingly, the temperature of the hydrogen occlusion tank may be properly controlled, and hydrogen may be stably discharged from the hydrogen occlusion tank.

According to the fifteenth aspect of the present invention, in accordance with the fourteenth aspect of the invention, the hydrogen supplying device for a fuel cell further includes a target temperature calculation unit (for example, step S111, S121, S311, and S321 in the first or third embodiment which will be described later) which calculates a target temperature of the heating medium based on the temperature of the hydrogen occlusion tank, wherein the heating unit is controlled so that the temperature of the heating medium reaches the target temperature.

According to the hydrogen supplying device for a fuel cell having the above mentioned configuration, it becomes possible to securely control the temperature of the hydrogen occlusion tank to be a desired temperature. Accordingly, the amount of hydrogen supplied to the fuel cell from the hydrogen occlusion tank may be properly controlled.

According to the sixteenth aspect of the present invention, in accordance with the fifteenth aspect of the invention, the target temperature of the heating medium is corrected based on a quantity of heat required by the heating unit for heating the hydrogen occlusion tank and the required quantity of heat calculated by the required quantity of heat calculation unit.

According to the hydrogen supplying device for a fuel cell having the above mentioned configuration, since the target temperature of the heating medium is corrected based on the quantity of heat required by the heating unit and the calculated required quantity of heat, it becomes possible to quickly and accurately control the temperature of the heating medium. Accordingly, hydrogen may be supplied to the fuel cell from the hydrogen occlusion tank in a stable manner.

According to the seventeenth aspect of the present invention, in accordance with the sixteenth aspect of the invention, the rate of change in the temperature of the hydrogen occlusion tank is calculated based on the quantity of heat required by the heating unit and the required quantity of heat calculated by the required quantity of heat calculation unit, and a target temperature is corrected to be higher than the target temperature calculated by the target temperature calculation unit if the rate of change in the temperature of the hydrogen occlusion tank is decreasing, and a target temperature is corrected to be lower than the target temperature calculated by the target temperature calculation unit if the rate of change in the temperature of the hydrogen occlusion tank is increasing.

According to the hydrogen supplying device for a fuel cell having the above mentioned configuration, since the target temperature of the heating medium is corrected to be higher when the temperature of the hydrogen occlusion tank is decreasing, and to be lower when the temperature of the hydrogen occlusion tank is increasing, it becomes possible to estimate the change in the temperature of the hydrogen occlusion tank and to quickly attain the target temperature of the heating medium so that the temperature of the hydrogen occlusion tank may be controlled to be a desired temperature.

BRIEF DESCRIPTION OF THE DRAWINGS

Some of the features and advantages of the invention having been described, others will become apparent from the detailed description which follows, and from the accompanying drawings, in which:

FIGS. 2A through 2C are flowcharts showing a hydrogen supplying process according to the first embodiment of the present invention;

DESCRIPTION OF THE PREFERRED EMBODIMENTS

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples of the invention.

In the following, embodiments of the hydrogen supplying device according to the present invention will be described with reference to FIGS. 1 through 10.

First Embodiment

First, the hydrogen supplying device according to a first embodiment of the invention will be described with reference to FIGS. 1 through 6.

Figure 1:
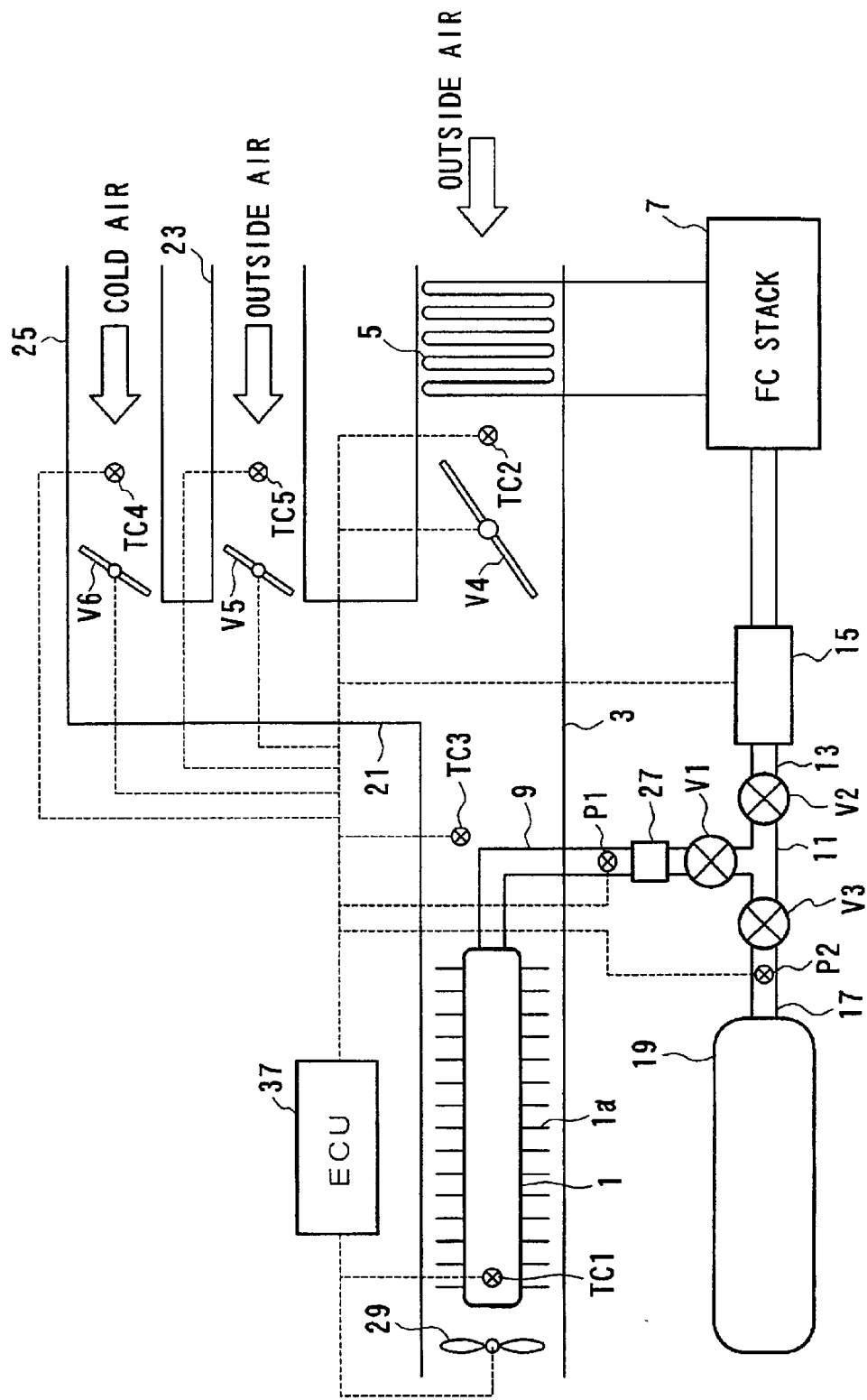
FIG. 1 is a schematic structural diagram showing a fuel cell system for a vehicle including a hydrogen supplying device according to the first embodiment of the present invention.

FIG. 1 is a block diagram showing a fuel cell system for an vehicle provided with a hydrogen supplying device according to the first embodiment of the invention. In FIG. 1, the hydrogen supplying device includes a duct 3 through which air flows as a heating medium, and a hydrogen occlusion tank 1, in which a hydrogen occlusion alloy is contained, is disposed at the downstream side in the duct 3. The hydrogen occlusion tank 1 may be made of a stainless steel, and a number of fins 1a are provided at the outer surface thereof.

A heat exchange tube 5 is disposed at the upstream side of the hydrogen occlusion tank 1 in the duct 3. The heat exchange tube 5 is connected to a coolant system (not shown in the figure) of a fuel cell 7 (denoted as FC stack in FIG. 1) which is disposed outside of the duct 3 so that the coolant for the fuel cell 7 may be circulated. The fuel cell 7 is a solid polymer membrane type fuel cell which generates power by electrochemically reacting hydrogen with oxygen present in an atmosphere. The above-mentioned coolant is used for removing heat, which is generated when power is generated by the fuel cell 7. The coolant, which was used for cooling the fuel cell 7 and, in turn, received heat from the fuel cell 7 and was heated, is introduced into the heat exchanging tube 5 in order to exchange heat with the air flowing through the duct 3 when passes through the heat exchanging tube 5. In this manner, the coolant is refrigerated and circulated through the coolant system of the fuel cell 7. That is, the heat exchanging tube 5 may be said to be a cooling radiator for the fuel cell 7. The air, which is heated by exchanging heat with the coolant, flows through the duct 3 to the hydrogen occlusion tank 1 and supplies heat to the hydrogen occlusion tank 1.

Hydrogen discharged from the hydrogen occlusion alloy in the hydrogen occlusion tank 1 is supplied to the fuel cell 7 via a hydrogen supply line 9, a flow rate controlling valve V1, a hydrogen supply line 11, a flow rate controlling valve V2, and a hydrogen supply line 13. A pressure regulator 27 is provided with the hydrogen supply line 9, and a flowmeter 15 is provided with the hydrogen supply line 13. The pressure regulator 27 is used to reduce the pressure of hydrogen when the hydrogen is supplied to the hydrogen occlusion tank 1 from the hydrogen tank 19. The setting pressure of the pressure regulator 27 is adjusted so as to be the same as the regular withstanding pressure of the hydrogen occlusion tank 1. The flowmeter 15 outputs an output signal, which corresponds to the flow rate of hydrogen that flows through the hydrogen supply line 13 (i.e., the flow rate of hydrogen supplied to the fuel cell 7), to an electrical control unit (hereinafter abbreviated as EC) 37.

Also, a hydrogen tank 19 is disposed outside of the duct 3. The hydrogen tank 19 is capable of compressing and storing hydrogen at a pressure higher than that in the hydrogen occlusion tank 1. The hydrogen stored in the hydrogen tank 19 may also be supplied to the fuel cell 7 via a hydrogen supply line 17, a flow rate controlling valve V3, the hydrogen supply line 11, the flow rate controlling valve V2, and the hydrogen supply line 13. Hydrogen is supplied to the fuel cell 7 from the hydrogen tank 19 when hydrogen cannot be discharged from the hydrogen occlusion alloy in the hydrogen occlusion tank 1 due to a low temperature, or when the amount of hydrogen discharged from the hydrogen occlusion alloy is insufficient for that required by the fuel cell 7.

A driving member (not shown in the figure) for actuating a valve element of the flow rate controlling valves V1–V3, respectively, is electrically connected to the ECU 37, and the opening degree of each of the valve elements is controlled by a command signal output from the ECU 37.

On the other hand, a junction duct 21 is connected to the duct 3 at a point between the hydrogen occlusion tank 1 and the heat exchange tube 5. An outside air duct 23 through which the outside air may be introduced, and a cold air duct 25 through which a cold air refrigerated by a cooler (not shown in the figure) may be introduced, are connected to the junction duct 21.

A fan 29 is disposed in the duct 3 at the downstream side of the hydrogen occlusion tank 1, and a driving unit (not shown in the figure) for the fan 29 is electrically connected to the ECU 37 so that the rotation speed thereof may be controlled in accordance with a command signal from the ECU 37.

Also, a flow rate controlling valve V4 is disposed in the duct 3 between the junction duct 21 and the heat exchange tube 5. Moreover, flow rate controlling valves V5 and V6 are provided with the outside air duct 23 and the cold air duct 25, respectively. Each of the driving units (not shown in the figure) for actuating a valve element of the flow rate controlling valves V4–V6 is electrically connected to the ECU 37, and the degree of opening of each of the valve elements is controlled by a command signal output from the ECU 37.

Pressure sensors P1 and P2 are provided with the hydrogen supply lines 9 and 17, respectively, and each of the pressure sensors P1 and P2 outputs a signal to the ECU 37 which corresponds to a detected pressure.

A temperature sensor TC1 for detecting a temperature of the hydrogen occlusion alloy is disposed in the hydrogen occlusion tank 1. Also, temperature sensors TC2 and TC3 are disposed in the duct 3 between the heat exchange tube 5 and the flow rate controlling valve V4, and between the junction duct 21 and the hydrogen occlusion tank 1, respectively. Moreover, temperature sensors TC4 and TC5 are provided with the cold air duct 25 and the outside air duct 23, respectively. Each of these temperature sensors TC1–TC5 outputs a signal to the ECU 37 which corresponds to a detected temperature.

In the hydrogen supplying device for a fuel cell according to the embodiment of the present invention having the above-mentioned configuration, in order to generate power in a travelling mode, the flow rate controlling valves V1 and V2 are opened to make the hydrogen supply lines 9, 11, and 13 communicate with each other, and the flow rate controlling valve V3 is closed to close the hydrogen supply line 17 so that hydrogen discharged from the hydrogen occlusion alloy in the hydrogen occlusion tank 1 is supplied to the fuel cell 7. Also, the outside air, which is introduced into the duct 3 by means of the fan 29, is heated by a heat exchange process with the cold water which flows through the heat exchange tube 5, and the heated outside air is supplied to the fins 1$a$ of the hydrogen occlusion tank 1 so that heat is absorbed by the hydrogen occlusion tank 1 via the fins 1$a$. In this manner, heat is supplied to the hydrogen occlusion tank 1 in order to compensate for the heat which is lost when hydrogen is discharged from the hydrogen occlusion alloy in the hydrogen occlusion tank 1.

Also, the pressure in the hydrogen occlusion tank 1 is controlled to be a certain constant pressure in order to assure a stable supply of hydrogen to the fuel cell 7. For this purpose, the temperature of the hydrogen occlusion alloy, i.e., the temperature in the hydrogen occlusion tank 1, is controlled to be a temperature (a set value=$t0$) which corresponds to the above-mentioned constant pressure as a dissociation pressure.

In order to control the temperature of the hydrogen occlusion tank 1 in the hydrogen supplying device according to the embodiment of the present invention, the outside air introduced through the outside air duct 23, the cold air introduced through the cold air duct 25, and the outside air which is introduced from an upstream end of the duct 3 and is heated by the heat exchange tube 5 (hereinafter referred to as a heated outside air, which should be distinguished from an outside air introduced through the outside air duct 23), are mixed at a predetermined flow rate ratio so that a quantity of heat necessary for controlling the temperature of the hydrogen occlusion tank 1 to be a predetermined temperature is supplied to the hydrogen occlusion tank 1.

However, in some cases, depending on the operational conditions for the fuel cell 7 (i.e., the operational conditions for an vehicle), the quantity of heat necessary for supplying heat to the hydrogen occlusion tank 1 becomes insufficient and hydrogen cannot be discharged from the hydrogen occlusion alloy at all, or even if hydrogen can be discharged from the hydrogen occlusion alloy, the amount of hydrogen required by the fuel cell 7 cannot be supplied from the hydrogen occlusion tank 1 since the hydrogen occlusion tank 1 (i.e., the hydrogen occlusion alloy) cannot satisfy the heat of the quantity required.

In such cases, in the hydrogen supplying device according to the first embodiment of the present invention, only hydrogen in the hydrogen tank 19 is supplied to the fuel cell 7 if the temperature of the hydrogen occlusion alloy is lower than a lower limit value (i.e., a lower limit temperature) $t1$, and only hydrogen in the hydrogen occlusion tank 1 is supplied to the fuel cell 7 if the temperature of the hydrogen occlusion alloy is equal to or higher than the lower limit value $t1$ and equal to or lower than a higher limit value (i.e., a higher limit temperature) $t2$. In this manner, hydrogen is supplied only from the hydrogen occlusion tank 1 to the fuel cell 7 when a quantity of heat required by the hydrogen occlusion tank 1 can be supplied by the heating medium (the air) (i.e., the temperature of the hydrogen occlusion tank 1 is not lowered if hydrogen is discharged), and hydrogen is supplied from both the hydrogen occlusion tank 1 and the hydrogen tank 19 at a predetermined flow rate ratio to the fuel cell 7 when a quantity of heat required by the hydrogen occlusion tank 1 cannot be supplied by the heating medium (the air) if hydrogen is supplied to the fuel cell 7 only from the hydrogen occlusion tank 1 (i.e., the temperature of the hydrogen occlusion tank 1 is lowered if hydrogen is discharged). If the temperature of the hydrogen occlusion alloy is higher than the upper limit value $t2$, only hydrogen in the hydrogen occlusion tank 1 is supplied to the fuel cell 7.

Figure 2A:
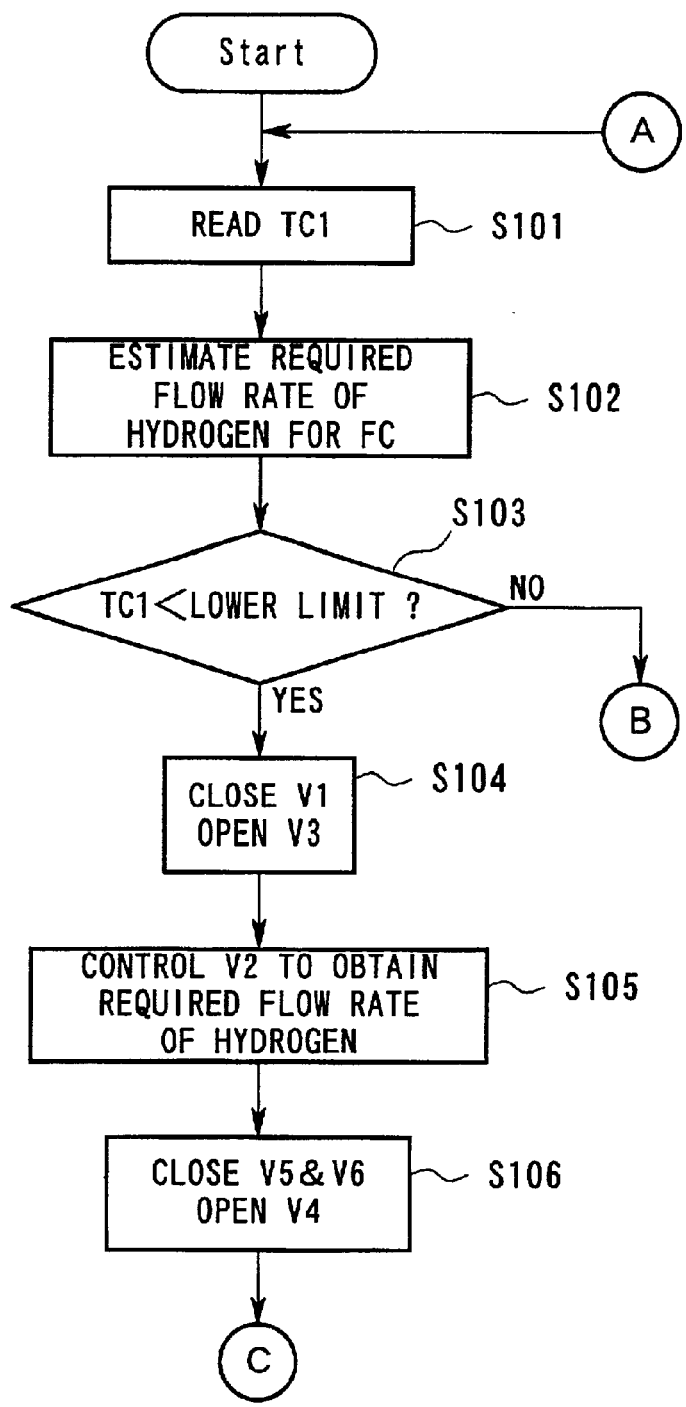
Figure 2B:
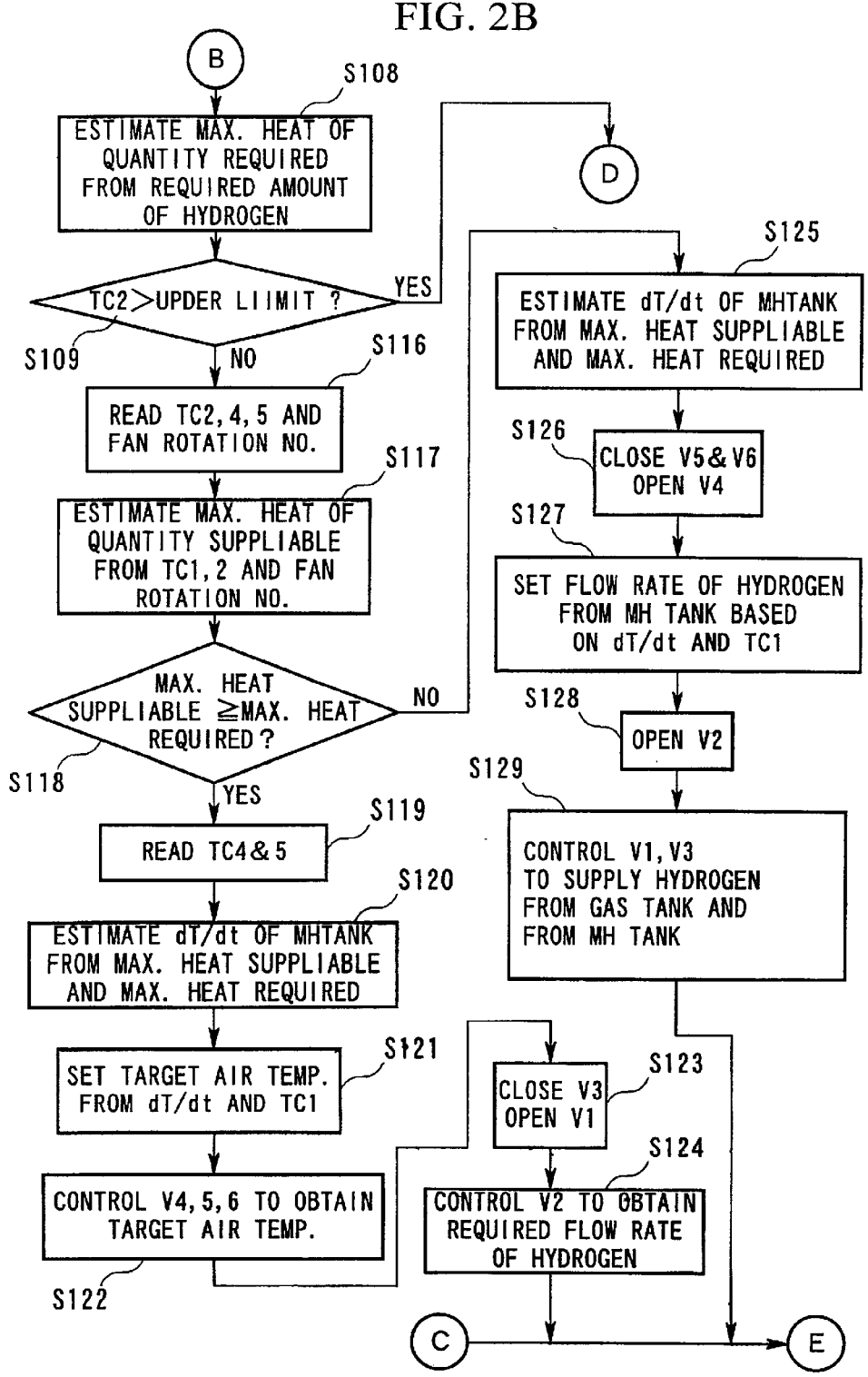

Next, a process for supplying hydrogen to a fuel cell in a travelling mode of a vehicle according to the first embodiment of the invention will be explained with reference to FIGS. 2A through 2C. Note that in the flowcharts shown in FIGS. 2A through 2C, the hydrogen occlusion tank is indicated as the MH tank, and the hydrogen tank is indicated as the gas tank. Also, in this embodiment, the temperature of the hydrogen occlusion tank 1 is controlled to be the set value $t0$ in the travelling mode (the lower limit value $t1<t0<$the upper limit value $t2$).

The hydrogen supplying device according to this embodiment of the present invention enters its travelling mode when a starting operation is completed. In step S101, the ECU 37 reads an output signal from the temperature sensor TC1 and calculates the temperature of the hydrogen occlusion alloy contained in the hydrogen occlusion tank 1 based on the output signal.

Then, in step S102, the ECU 37 estimates the flow rate of hydrogen required for the fuel cell 7 based on the opening degree of an accelerator of a vehicle, the output, and so forth.

In step S103, it is determined if the temperature of the hydrogen occlusion alloy is lower than the lower limit value t1. The lower limit value t1 is a threshold value indicating if a discharge of hydrogen from the hydrogen occlusion alloy is possible. Accordingly, the hydrogen occlusion alloy may discharge hydrogen if the temperature thereof is equal to or higher than the lower limit value t1, and the hydrogen occlusion alloy cannot discharge hydrogen if its temperature is lower than the lower limit value t1.

If it is determined to be "YES" in step S103, i.e., if it is determined that the temperature of the hydrogen occlusion alloy is lower than the lower limit value t1, hydrogen cannot be discharged from the hydrogen occlusion alloy and the process proceeds to step S104. In step S104, the supply of hydrogen to the fuel cell 7 from the hydrogen occlusion tank 1 is stopped by completely closing the flow rate controlling valve V1, and the flow rate controlling valve V3 is fully opened so that hydrogen may be supplied to the fuel cell 7 from the hydrogen tank 19.

Then, in step S105, the opening degree of the flow rate controlling valve V2 is controlled so that the flow rate of hydrogen estimated to be required in step S102 is supplied to the fuel cell 7. In step S106, the flow rate controlling valves V5 and V6 are completely closed to stop the introduction of the outside air and the cold air through the outside air duct 23 and the cold air duct 25, respectively, and the flow rate controlling valve V4 is fully opened so that outside air to be heated is introduced through the duct 3 to supply only the heated outside air to the hydrogen occlusion tank 1. In this manner, the heated outside air having the highest temperature possible is supplied to the hydrogen occlusion tank 1 to increase and recover the temperature of the hydrogen occlusion tank 1.

Then, in step S107 shown in FIG. 2C, it is determined if there is a command for terminating the operation. If it is determined that there is no command, the process returns to step S101. On the other hand, if it is determined that there is a command for terminating the operation, the process of this routine paused temporarily.

On the other hand, if it is determined to be "No" in step S103, i.e., if it is determined that the temperature of the hydrogen occlusion alloy is equal to or higher than the lower limit value t1, hydrogen may be discharged from the hydrogen occlusion alloy and the process proceeds to step S108. In step S108, a maximum quantity of heat required is estimated based on the required flow rate of hydrogen estimated in step S102 since the quantity of heat required by the hydrogen occlusion tank 1 is proportional to the amount of hydrogen discharged from the hydrogen occlusion tank 1.

The term "a maximum quantity of heat required" (by the hydrogen occlusion tank 1) means a quantity of heat which will be lost from the hydrogen occlusion tank 1 if all of the flow amount of hydrogen required by the fuel cell 7 is discharged from the hydrogen occlusion tank 1. In other words, the term "a maximum quantity of heat required" means a quantity of heat necessary to be supplied to the hydrogen occlusion tank 1 so that the temperature of the hydrogen occlusion alloy is not significantly changed (i.e., lowered) when all of the flow rate of hydrogen required by the fuel cell 7 is discharged from the hydrogen occlusion tank 1.

Then, in step S109, it is determined if the temperature of the hydrogen occlusion alloy is higher than the upper limit value t2. The upper limit value t2 is a threshold value at which the hydrogen occlusion tank 1 should be cooled down.

If it is determined to be "YES" in step S109, i.e., if it is determined that the temperature of the hydrogen occlusion alloy is higher than the upper limit value t2, the process proceeds to step S110. In step S110, the rate of change in temperature (dT/dt) is estimated from the quantity of heat required, assuming no heat is supplied to the hydrogen occlusion tank 1, based on the fact that the rate of change in the temperature of the hydrogen occlusion tank 1 is proportional to the quantity of heat required. In other words, the rate of change in the temperature (dT/dt) of the hydrogen occlusion tank 1 is calculated from the difference between a quantity of heat supplied for heating the hydrogen occlusion tank 1 (in this case dT/dt=0) and the maximum quantity of heat required calculated in step S108.

Then, in step S111, the temperature of air to be supplied to the hydrogen occlusion tank 1 (hereinafter referred to as a target air temperature) is determined based on the temperature of the hydrogen occlusion alloy and the rate of change in the temperature (dT/dt) estimated in step S110. That is, a provisional target temperature corresponding to the temperature of the hydrogen occlusion alloy is calculated by referring to the provisional target temperature map shown in FIG. 3, and a provisional target temperature coefficient corresponding to the estimated rate of change in the temperature (dT/dt) is calculated by referring to the provisional target temperature coefficient map shown in FIG. 4 so that the target air temperature is calculated by multiplying the provisional target temperature by the provisional target temperature coefficient. In other words, the target air temperature is corrected by the multiplication by the provisional target temperature coefficient.

Figure 4:
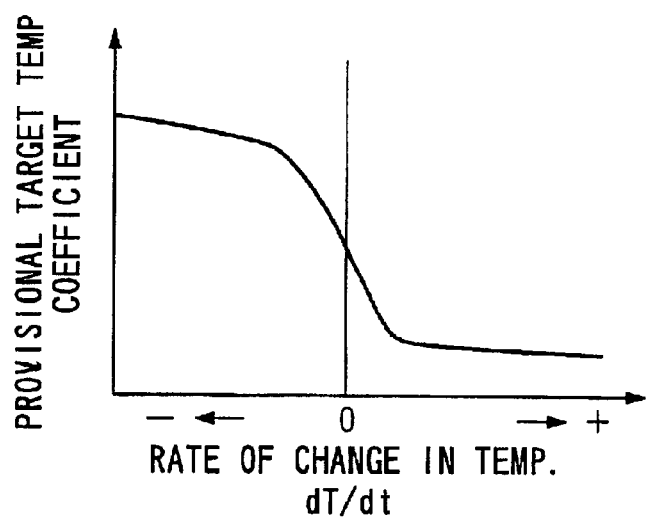
FIG. 4 is a graph showing a provisional target temperature coefficient map used in the first embodiment according to the present invention.

In the provisional target temperature coefficient map shown in FIG. 4, a target air temperature where the rate of change in temperature (dT/dt) is zero, i.e., there is no change in the temperature of the hydrogen occlusion tank 1, is used as a reference. In FIG. 4, the provisional target temperature coefficient is plotted so that a target air temperature increases when the rate of change in temperature (dT/dt) is negative, i.e., when the rate of change in temperature is decreasing. Also, the provisional target temperature coefficient is plotted so that a target air temperature decreases when the rate of change in temperature (dT/dt) is positive, i.e., when the rate of change in temperature is increasing.

By correcting the target air temperature as explained above, it becomes possible to control the temperature of air supplied to the hydrogen occlusion tank 1 so as to quickly reach the true target air temperature.

Also, the above-mentioned provisional target temperature coefficient is plotted so that the target air temperature increases as the decreasing rate of the temperature of the hydrogen occlusion tank 1 increases, and that the target air temperature decreases as the increasing rate of the temperature of the hydrogen occlusion tank 1 increases. In this manner, it becomes possible to always stably maintain the temperature of the hydrogen occlusion tank 1, and hydrogen may be discharged from the hydrogen occlusion alloy in a stable manner.

Figure 3:
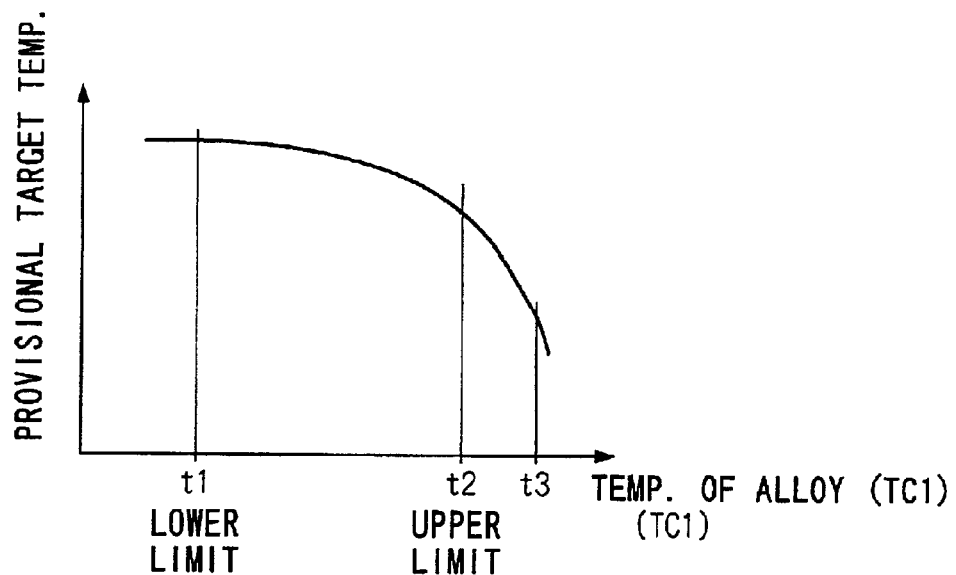
FIG. 3 is a graph showing a provisional target temperature map used in the first embodiment according to the present invention.

Note that the temperature t3 shown in FIG. 3 is a temperature corresponding to the regular withstand pressure of the hydrogen occlusion tank 1, which is regarded as a dissociation pressure, and hence it is necessary to control the temperature of the hydrogen occlusion tank 1 so as to be lower than the temperature t3.

Then, in step S112, the temperature of the cold air introduced via the cold air duct 25 and that of the outside air introduced via the cold air duct 23, respectively, is calculated based on the output signals from the temperature sensors TC4 and TC5.

After this, in step S113, the opening degree of the flow rate controlling valves V4, V5, and V6, respectively, is controlled so as to realize the above-mentioned target air temperature.

Then, in step S114, the flow rate controlling valve V3 is completely closed to stop the supply of hydrogen from the hydrogen tank 19 to the fuel cell 7, and the flow rate controlling valve V1 is fully opened so that hydrogen may be supplied to the fuel cell 7 from the hydrogen occlusion tank 1.

After this, in step S115, the degree of opening of the flow rate controlling valve V2 is controlled so as to realize the required flow rate of hydrogen, which is estimated in step S102. Then, the process proceeds to step S107. Since the process after the step S107 has already been explained in the above, the explanation thereof is omitted.

On the other hand, if it is determined to be "NO" in step S109, i.e., if it is determined that the temperature of the hydrogen occlusion alloy is equal to or lower than the upper limit value t2, the process proceeds to step S116. In step S116, the temperature of the heated air at the immediately downstream side of the heat exchange tube 5, the temperature of the cold air introduced via the cold air duct 25, and the temperature of the outside air introduced via the outside air duct 23 are calculated based on the output signals from the temperature sensors TC2, TC4, and TC5, respectively. Also, the amount of air supplied to the hydrogen occlusion tank 1 is calculated based on the rotation speed of the fan 29.

Then, in step S117, "a maximum quantity of heat suppliable" which may be supplied to the hydrogen occlusion tank 1 is estimated based on the temperature of the hydrogen occlusion alloy, the temperature of the heated air immediately downstream of the heat exchange tube 5, and the amount of the heated air available to be supplied to the hydrogen occlusion tank 1. The highest temperature of the heated air which can be supplied to the hydrogen occlusion tank 1 is a temperature of the heated air present at an immediately downstream side of the heat exchange tube 5, and the quantity of heat suppliable may reach its maximum when only the above-mentioned heated air is supplied to the hydrogen occlusion tank 1. It is possible to estimate the maximum quantity of heat suppliable since the maximum quantity of heat suppliable is proportional to the difference in temperature between the temperature of the heated air present at the immediately downstream side of the heat exchange tube 5 and the temperature of the hydrogen occlusion alloy.

After this, in step S118, it is determined if the maximum quantity of heat suppliable estimated in step S117 is equal to or larger than the maximum quantity of heat required estimated in step S108. If the maximum quantity of heat suppliable is equal to or larger than the maximum quantity of heat required, it is estimated that the rate of change in temperature (dT/dt) of the hydrogen occlusion alloy becomes positive (i.e., its temperature increases), and if the maximum quantity of heat suppliable is smaller than the maximum quantity of heat required, it is estimated that the rate of change in the temperature of the hydrogen occlusion alloy becomes negative (i.e., its temperature decreases).

If it is determined to be "YES" in step S118, i.e., the maximum quantity of heat suppliable is equal to or larger than the maximum quantity of heat required, the process proceeds to step S119. In step S119, the temperature of the cold air introduced via the cold air duct 25 and the temperature of the outside air introduced via the outside air duct 23 are calculated based on the output signals from the temperature sensors TC4 and TC5, respectively.

Then, in step S120, the rate of change in temperature (dT/dt) of the hydrogen occlusion tank 1 is estimated based on the maximum quantity of heat suppliable and the maximum quantity of heat required based on the fact that the rate of change in temperature is proportional to the difference in the quantity of heat between the maximum quantity of heat suppliable and the maximum quantity of heat required.

In step S121, the temperature of air to be supplied to the hydrogen occlusion tank 1 (i.e., the target air temperature) is set based on the temperature of the hydrogen occlusion alloy and the rate of change in temperature (dT/dt) estimated in step S120. The same method described in step S111 is also used for setting the target air temperature. That is, a provisional target temperature corresponding to the temperature of the hydrogen occlusion alloy is calculated by referring to the provisional target temperature map shown in FIG. 3, and a provisional target temperature coefficient corresponding to the estimated rate of change in temperature (dT/dt) is calculated by referring to the provisional target temperature coefficient map shown in FIG. 4 so that the target air temperature may be calculated by multiplying the provisional target temperature by the provisional target temperature coefficient. In other words, the target air temperature is corrected by the multiplication by the provisional target temperature coefficient. In this manner, it becomes possible to control the temperature of air supplied to the hydrogen occlusion tank 1 so as to quickly reach the true target air temperature.

Then, in step S122, the opening degree of the flow rate controlling valves V4, V5, and V6, respectively, is controlled so as to realize the above-mentioned target air temperature.

After this, in step S123, the flow rate controlling valve V3 is completely closed to stop the supply of hydrogen to the fuel cell 7 from the hydrogen tank 19, and the flow rate controlling valve V1 is fully opened so that hydrogen may be supplied from the hydrogen occlusion tank 1 to the fuel cell 7.

Then, in step S124, the opening degree of the flow rate controlling valve V2 is controlled so that the required flow rate of hydrogen estimated in step S102 is realized, and the process proceeds to step S107. Since the process after the step S107 has already been described, the explanation thereof is omitted.

If it is determined to be "NO" in step S118, on the other hand, i.e., if it is determined that the maximum quantity of heat suppliable is smaller than the maximum quantity of heat required, the process proceeds to step S125. In step S125, the rate of change in temperature (dT/dt) of the hydrogen occlusion tank 1 is estimated based on the maximum quantity of heat suppliable and the maximum quantity of heat required based on the fact that the rate of change in temperature is proportional to the difference between the maximum quantity of heat suppliable and the maximum quantity of heat required.

Then, in step S126, the flow rate controlling valves V5 and V6 are completely closed to stop the introduction of the outside air and the cold air via the outside air duct 23 and the cold air duct 25, respectively, and the flow rate controlling valve V4 is fully opened to introduce an outside air through the duct 3 so that only heated outside air is supplied to the hydrogen occlusion tank 1. In this manner, the heated outside air having the highest temperature possible may be supplied to the hydrogen occlusion tank 1 so that the decrease in the temperature of the hydrogen occlusion tank 1 is prevented.

After this, in step S127, the ratio of the flow rate of hydrogen, which should be discharged from the hydrogen occlusion tank 1, to all the flow rate of supplying hydrogen (hereinafter referred to as a discharging ratio of the hydrogen occlusion tank 1) is calculated based on the temperature of the hydrogen occlusion alloy and the rate of change in temperature (dT/dt) of the hydrogen occlusion tank 1 estimated in step S125 by referring to the discharge ratio map shown in FIG. 5, and the flow rate of hydrogen discharged from the hydrogen occlusion tank 1 is determined by multiplying the discharging ratio by the required flow rate of hydrogen estimated in step S102.

Figure 5:
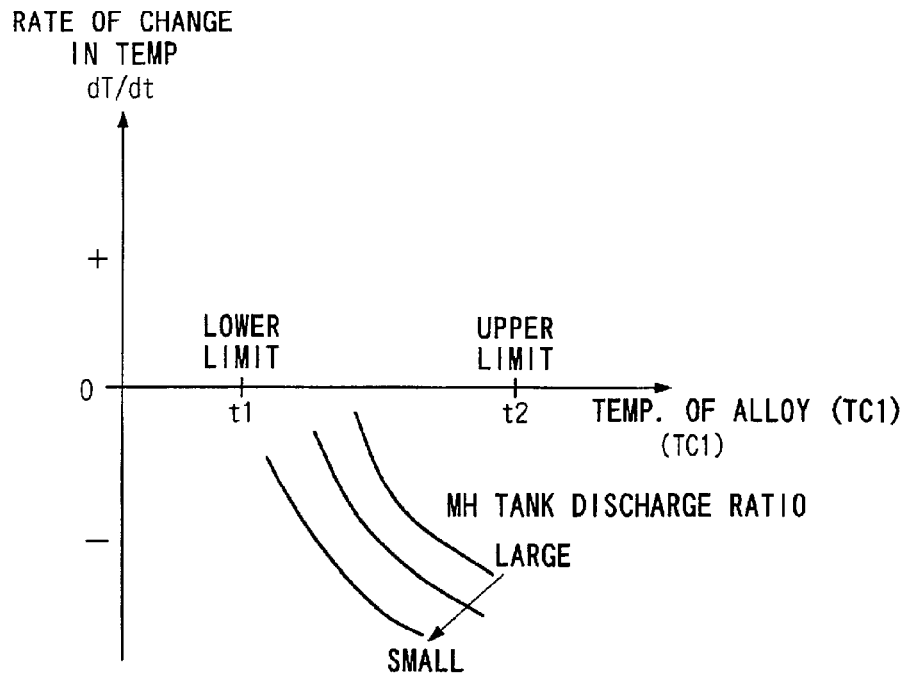
FIG. 5 is a graph showing a discharging ratio map used in the first embodiment according to the present invention.

Note that in the discharging ratio map shown in FIG. 5, the discharging ratio is determined so that the temperature of the hydrogen occlusion alloy approaches the set value t0, and the discharging ratio decreases as the absolute value of a negative rate of change in temperature (dT/dt) increases. Also, the discharging ratio decreases as the temperature of the hydrogen occlusion alloy decreases.

Then, in step S128, the flow rate controlling valve V2 is fully opened, and in step S129, the opening degree of the flow rate controlling valve V1 is controlled so that hydrogen may be discharged from the hydrogen occlusion tank 1 at a flow rate determined in step S127. Also, the opening degree of the flow rate controlling valve V3 is controlled to discharge hydrogen from the hydrogen tank 19 so that an amount of hydrogen, which cannot be supplied only by the hydrogen occlusion tank 1, may be supplemented by the discharge from the hydrogen tank 19. That is, the opening degree of the flow rate controlling valves V1 and V3 is controlled so that the total of the flow rate of hydrogen discharged from the hydrogen occlusion tank 1 and from the hydrogen tank 19 becomes the flow rate of hydrogen required for the fuel cell 7. In this manner, hydrogen discharged from the hydrogen occlusion tank 1 and that discharged from the hydrogen tank 19 are merged in the hydrogen supply line 11, and then supplied to the fuel cell 7.

After this, the process proceeds to step S107. Since the process after step S107 has already been described, the explanation thereof will be omitted.

Figure 6:
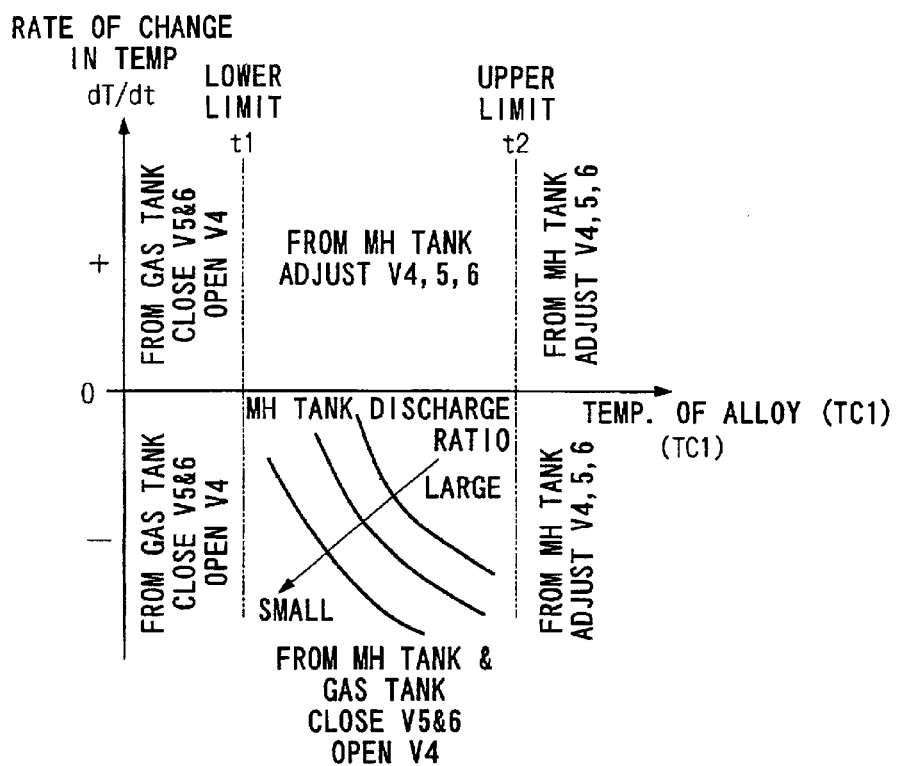
FIG. 6 is a graph showing control patterns used in the hydrogen supplying process according to the first embodiment of the present invention.
Figure 7A:
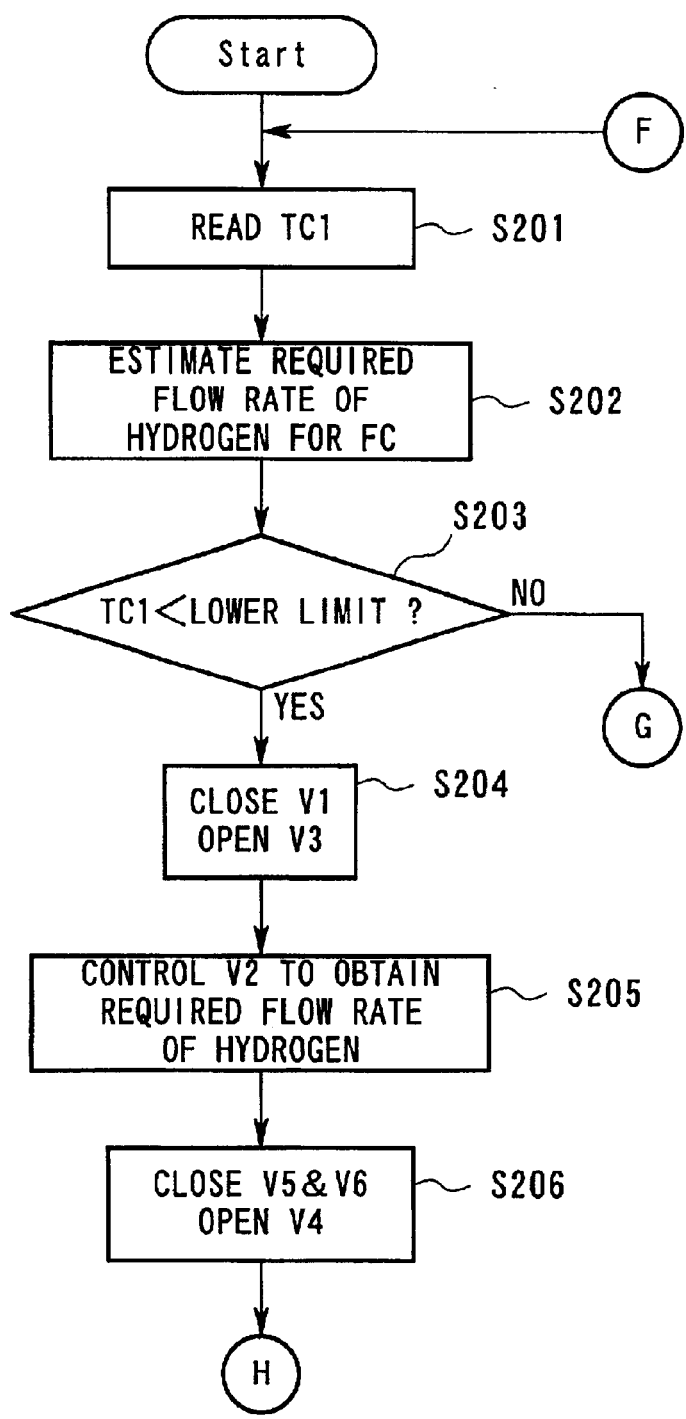
FIGS. 7A and 7B are flowcharts showing a hydrogen supplying process according to the second embodiment of the present invention.
Figure 7B:
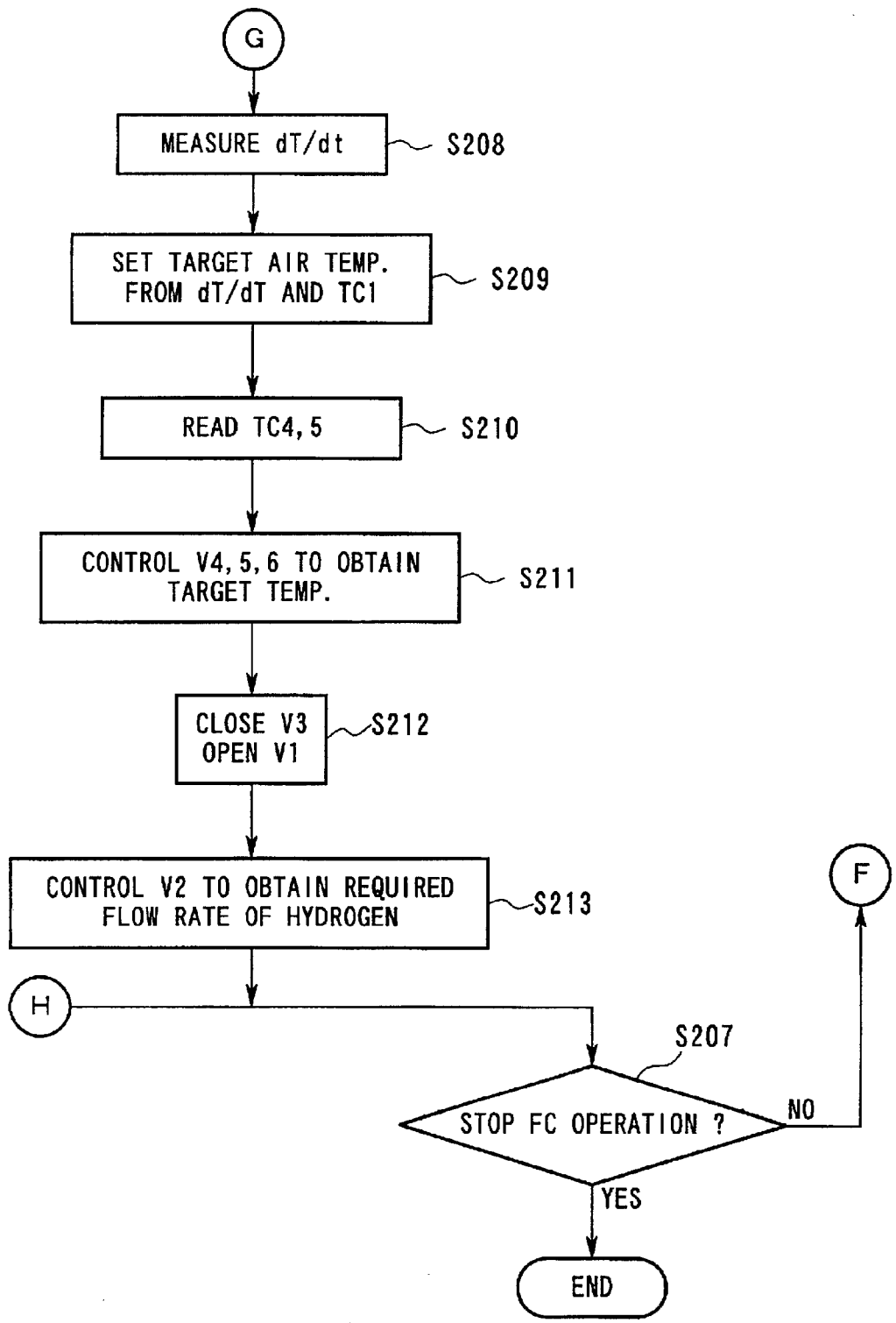

FIG. 6 is a graph showing control patterns used in the hydrogen supplying process explained above. In the graph shown in FIG. 6, the rate of change in temperature (dT/dt) of the hydrogen occlusion alloy is plotted on the longitudinal axis, and the temperature of the hydrogen occlusion alloy is plotted on the transverse axis. This will be explained as follows.

When the temperature of the hydrogen occlusion alloy is lower than the lower limit value t1, only hydrogen from the hydrogen tank 19 is supplied to the fuel cell 7 regardless of the rate of change in temperature (dT/dt), and only the outside air, which is introduced via an opening at the upstream side of the duct 3 and is heated by means of the heat exchange tube 5, is supplied to the fuel cell 7 so that the hydrogen occlusion tank 1 may be heated at an early stage.

Also, when the temperature of the hydrogen occlusion alloy is higher than the upper limit value t2, only hydrogen from the hydrogen occlusion tank 1 is supplied to the fuel cell 7 regardless of the rate of change in temperature (dT/dt), and the flow rate controlling valves V4, V5, and V6 are controlled so as to cool down the hydrogen occlusion tank 1. In this manner, the amount of hydrogen discharged from the hydrogen occlusion tank 1 may be increased and an increase in temperature of the hydrogen occlusion tank 1 is prevented. Accordingly, an increase in the pressure in the hydrogen occlusion tank 1 may also be prevented.

When the temperature of the hydrogen occlusion alloy is equal to or higher than the lower limit value t1 and is equal to or lower than the upper limit value t2, the control pattern differs depending on whether the rate of change in temperature (dT/dt) is positive or negative.

If the rate of change in temperature (dT/dt) is positive, only hydrogen in the hydrogen occlusion tank 1 is supplied to the fuel cell 7, and the flow rate controlling valves V4, V5, and V6 are controlled so that the temperature of air supplied to the hydrogen occlusion tank 1 reaches the target air temperature. In this manner, an increase in the temperature of the hydrogen occlusion tank 1 may be prevented.

On the other hand, if the rate of change in temperature (dT/dt) is negative, hydrogen is supplied to the fuel cell 7 from both the hydrogen occlusion tank 1 and the hydrogen tank 19 at a predetermined flow rate ratio, and only outside air, which is introduced via an opening of the duct 3 at the upstream side and is heated by the heat exchange tube 5, is supplied to the fuel cell 7 in order to heat the hydrogen occlusion tank 1. In this manner, a decrease in the temperature of the hydrogen occlusion tank 1 may be prevented.

As mentioned above, according to the hydrogen supplying device of the first embodiment of the present invention, it becomes possible to stably supply hydrogen to the fuel cell regardless of the temperature of the hydrogen occlusion tank 1.

Also, since the flow rate of hydrogen discharged from the hydrogen occlusion tank 1 and from the hydrogen tank 19 is controlled in accordance with the temperature of the hydrogen occlusion tank 1 and the rate of change in temperature (dT/dt) thereof, the temperature of the hydrogen occlusion tank 1 may quickly reach a desired temperature.

Second Embodiment

Next, a hydrogen supplying device for a fuel cell according to a second embodiment of the present invention will be described. Since the structure of the hydrogen supplying device of the second embodiment is substantially the same as that of the device according to the first embodiment, elements which are the same as those in the first embodiment are indicated by the same numerals and the explanation thereof will be omitted, and only a hydrogen supplying process to a fuel cell in a travelling mode used in the second embodiment will be explained with reference to flowcharts shown in FIGS. 7A and 7B.

In the second embodiment of the present invention, a hydrogen supply source to the fuel cell 7 is switched to the hydrogen tank 19 when the temperature of the hydrogen occlusion alloy is lower than the lower limit value t1, and is switched to the hydrogen occlusion tank 1 when the temperature of the hydrogen occlusion alloy is equal to or higher than the lower limit value t1.

Note that in the second embodiment of the present invention, as in the first embodiment, the temperature of the hydrogen occlusion tank 1 is controlled to become the set value t0 in the travelling mode (the lower limit value t1<t0<the upper limit value t2).

The hydrogen supplying device according to the second embodiment of the present invention enters its travelling mode when a starting operation is completed. In step S201, the ECU 37 reads an output signal from the temperature sensor TC1 and calculates the temperature of the hydrogen occlusion alloy contained in the hydrogen occlusion tank 1 based on the output signal.

Then, in step S202, the ECU 37 estimates the flow rate of hydrogen required for the fuel cell 7 based on the opening degree of an accelerator of a vehicle, the output, and so forth.

In step S203, it is determined whether the temperature of the hydrogen occlusion alloy is lower than the lower limit value t1.

If it is determined to be "YES" in step S203, i.e., if it is determined that the temperature of the hydrogen occlusion alloy is lower than the lower limit value t1, hydrogen cannot be discharged from the hydrogen occlusion alloy and the process proceeds to step S204. In step S204, the supply of hydrogen to the fuel cell 7 from the hydrogen occlusion tank 1 is stopped by completely closing the flow rate controlling valve V1, and the flow rate controlling valve V3 is fully opened so that hydrogen may be supplied to the fuel cell 7 from the hydrogen tank 19.

Then, in step S205, the opening degree of the flow rate controlling valve V2 is controlled so that the flow rate of hydrogen estimated in step S202 is supplied to the fuel cell 7. In step S206, the flow rate controlling valves V5 and V6 are completely closed to stop the introduction of outside air and cold air through the outside air duct 23 and the cold air duct 25, respectively, and the flow rate controlling valve V4 is fully opened so that outside air to be heated is introduced through the duct 3 to supply only the heated outside air to the hydrogen occlusion tank 1. In this manner, the heated outside air having the highest temperature possible is supplied to the hydrogen occlusion tank 1 to increase and recover the temperature of the hydrogen occlusion tank 1.

Then, in step S207, it is determined if there is a command for terminating the operation. If it is determined that there is no command for terminating the operation, the process returns to step S201. On the other hand, if it is determined that there is a command for terminating the operation, the process of this routine is terminated for a moment.

On the other hand, if it is determined to be "No" in step S203, i.e., if it is determined that the temperature of the hydrogen occlusion alloy is equal to or higher than the lower limit value t1, hydrogen may be discharged from the hydrogen occlusion alloy and the process proceeds to step S208. In step S208, the rate of change in the temperature (dT/dt) of the hydrogen occlusion alloy is measured.

Then, in step S209, the temperature of air to be supplied to the hydrogen occlusion tank 1 (the target air temperature) is determined based on the temperature of the hydrogen occlusion alloy and the rate of change in temperature (dT/dt) estimated in step S208. The method used for determining the target air temperature is the same as that used in the first embodiment. That is, a provisional target temperature corresponding to the temperature of the hydrogen occlusion alloy is calculated by referring to the provisional target temperature map shown in FIG. 3, and to a provisional target temperature coefficient corresponding to the estimated rate of change in temperature (dT/dt) is calculated by referring to the provisional target temperature coefficient map shown in FIG. 4 so that the target air temperature is calculated by multiplying the provisional target temperature by the provisional target temperature coefficient. In other words, the target air temperature is corrected by the multiplication by the provisional target temperature coefficient. By correcting the target air temperature as explained above, it becomes possible to control the temperature of air supplied to the hydrogen occlusion tank 1 so as to quickly reach the true target air temperature.

The provisional target temperature map, and the provisional target temperature coefficient map used in the second embodiment of the invention are the same as those used in the first embodiment, and the explanation thereof will be omitted.

Then, in step S210, the output signals from the temperature sensors TC4 and TC5, respectively, are read, and the temperature of the cold air introduced via the cold air duct 25 and the temperature of the outside air introduced via the outside air duct 23 are calculated based on the output signals.

After this, in step S211, the opening degree of the flow rate controlling valves V4, V5, and V6 is controlled so as to achieve the above-mentioned target air temperature.

Then, in step S212, the flow rate controlling valve V3 is completely closed to stop the supply of hydrogen from the hydrogen tank 19 to the fuel cell 7, and the flow rate controlling valve V1 is fully opened so that hydrogen may be supplied to the fuel cell 7 from the hydrogen occlusion tank 1.

After this, in step S213, the degree of opening of the flow rate controlling valve V2 is controlled so as to realize the required flow rate of hydrogen, which is estimated in step S202.

The process proceeds to step S207, and it is determined if there is a command for terminating the operation. If it is determined that there is no command for terminating the operation in step S207, the process returns to step S201. On the other hand, if it is determined that there is a command for terminating the operation in step S207, the process of this routine is terminated for a moment.

Figure 8:
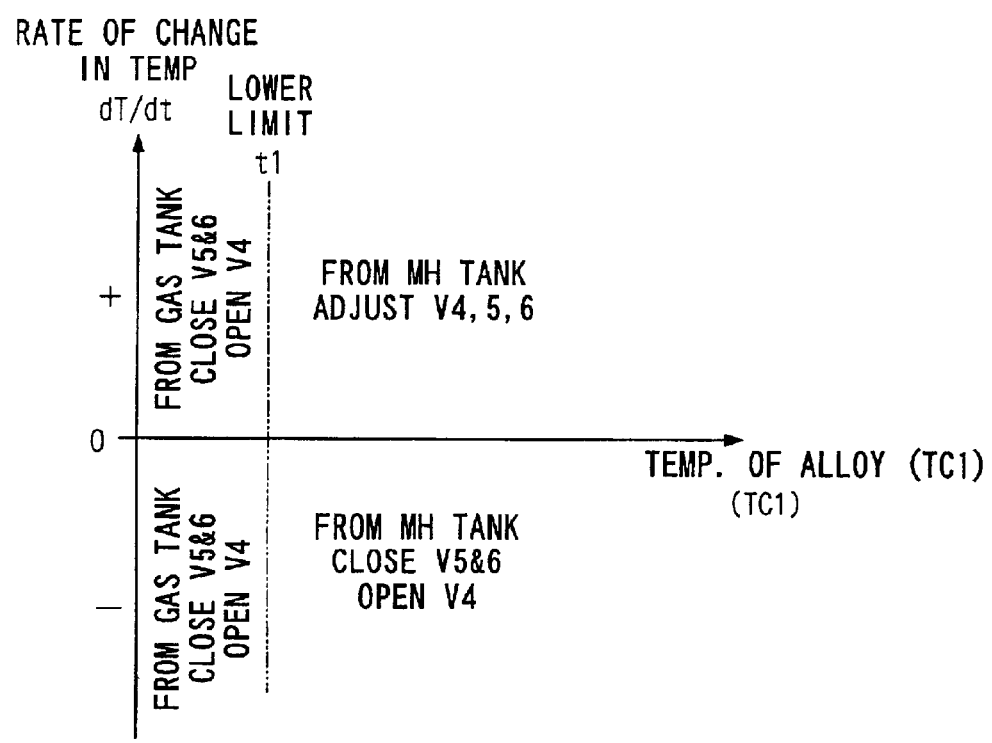
FIG. 8 is a graph showing control patterns used in the hydrogen supplying process according to the second embodiment of the present invention.
Figure 9A:
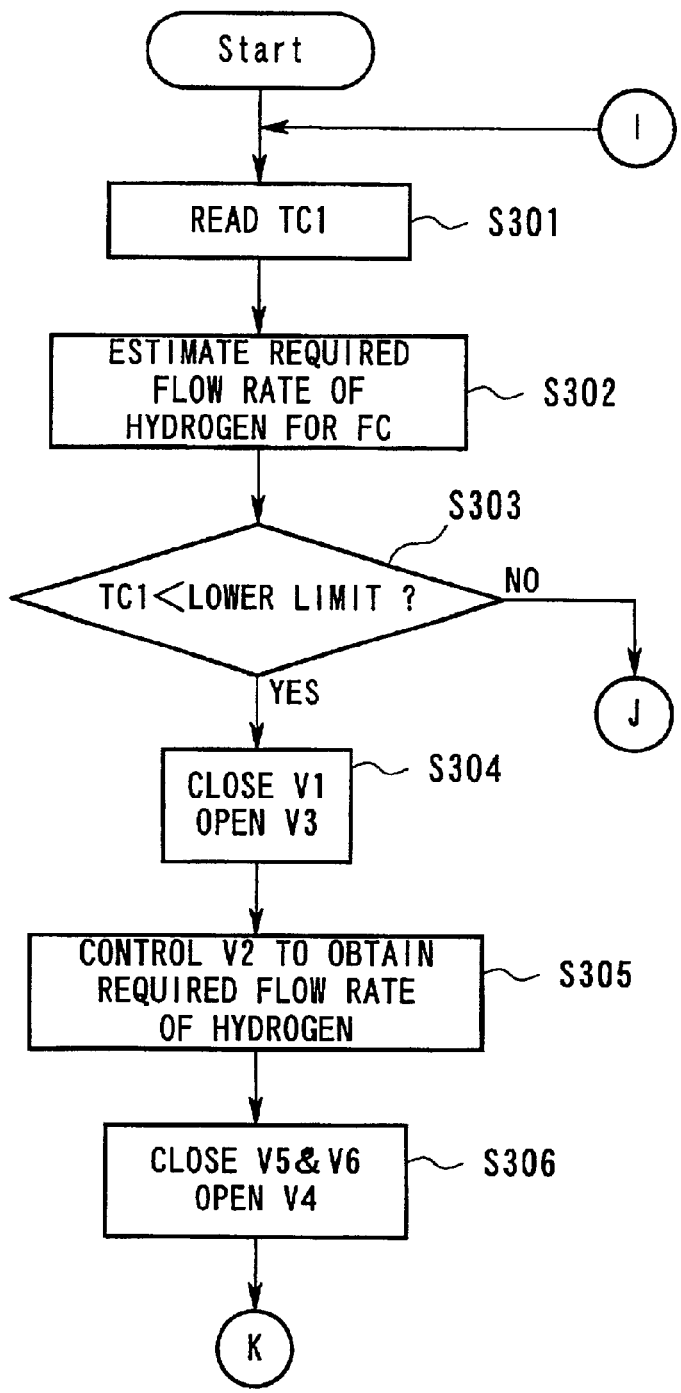
FIGS. 9A through 9C are flowcharts showing a hydrogen supplying process according to the third embodiment of the present invention.
Figure 9B:
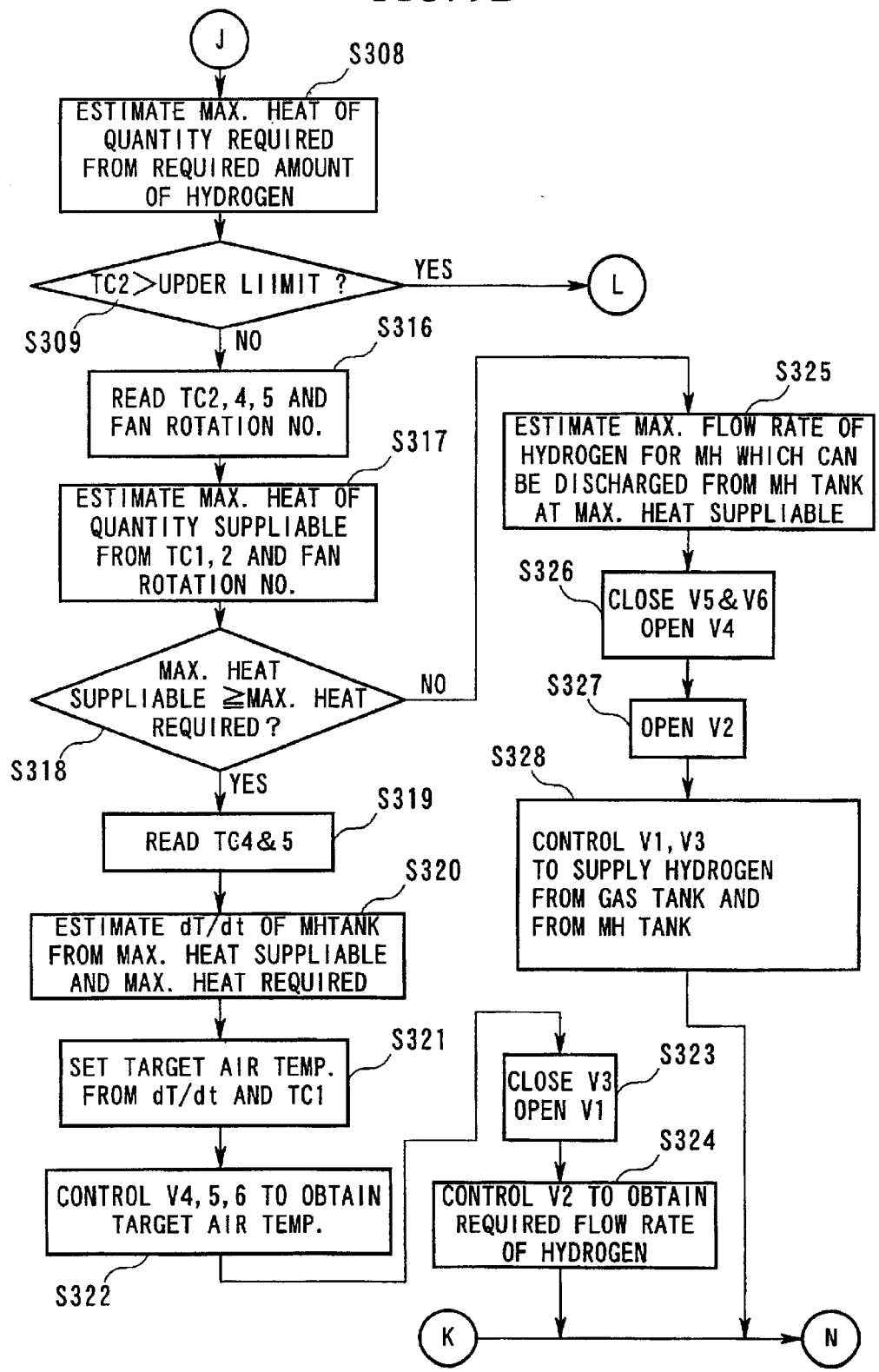
Figure 9C:
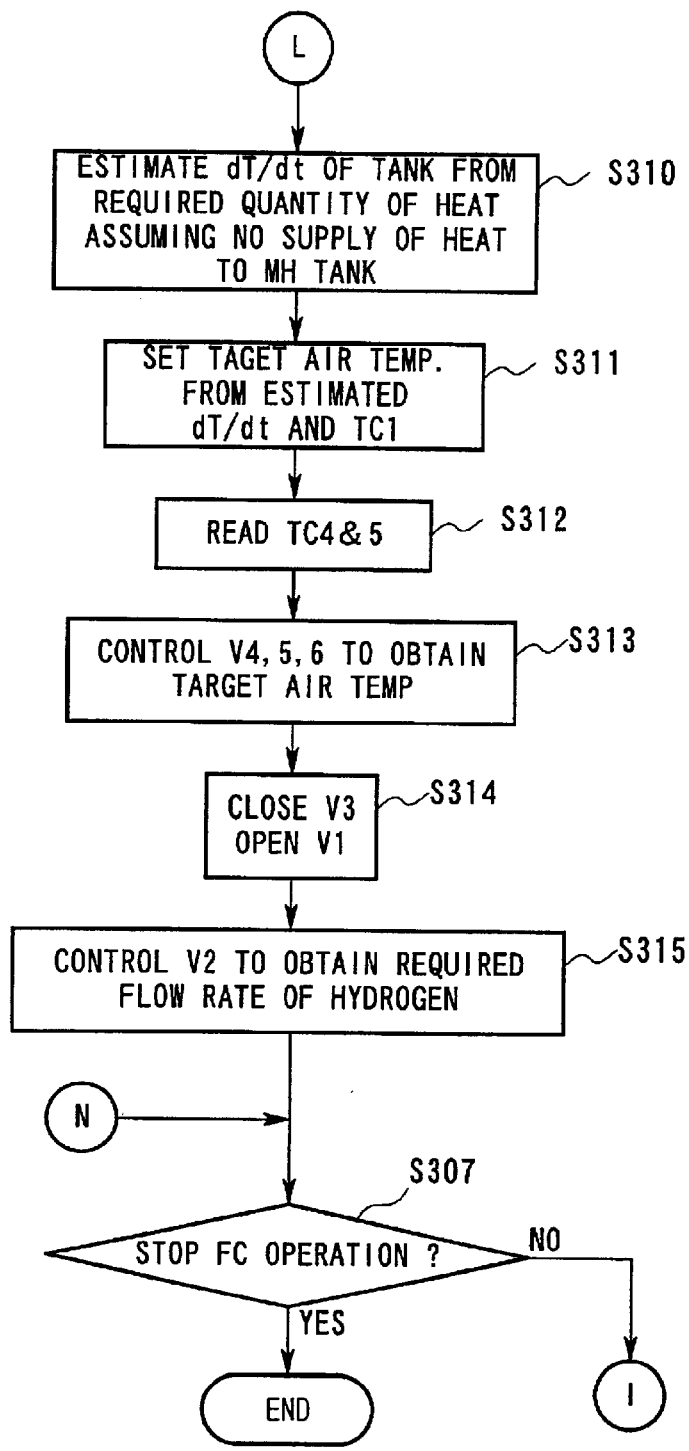

FIG. 8 is a graph showing control patterns used in the hydrogen supplying process explained above. In the graph shown in FIG. 8, the rate of change in the temperature (dT/dt) of the hydrogen occlusion alloy is plotted on the longitudinal axis, and the temperature of the hydrogen occlusion alloy is plotted on the transverse axis. This will be explained as follows.

When the temperature of the hydrogen occlusion alloy is lower than the lower limit value t1, only hydrogen from the hydrogen tank 19 is supplied to the fuel cell 7 regardless of the rate of change in temperature (dT/dt), and only the outside air to be heated, which is introduced via an opening at the upstream side of the duct 3 and is heated by means of the heat exchange tube 5, is supplied to the fuel cell 7 so that the hydrogen occlusion tank 1 may be heated at an early stage.

Also, when the temperature of the hydrogen occlusion alloy is equal to or higher than the lower limit value t1, only hydrogen from the hydrogen occlusion tank 1 is supplied to the fuel cell 7. At that time, the control pattern for air differs depending on whether the rate of change in temperature (dT/dt) is positive or negative. If the rate of change in temperature (dT/dt) is positive (i.e., the temperature is increasing), the opening degree of the flow rate controlling valves V4, V5, and V6 are controlled so that the temperature of air supplied to the hydrogen occlusion tank 1 reaches the target air temperature. On the other hand, if the rate of change in temperature (dT/dt) is negative (i.e., the temperature is decreasing), only the flow rate controlling valve V4 is fully opened so that only the outside air heated by the heat exchange tube 5 is supplied to the fuel cell 7 in order to increase and recover the temperature of the hydrogen occlusion tank 1.

As mentioned above, according to the hydrogen supplying device of the second embodiment of the present invention, it becomes possible to stably supply hydrogen to the fuel cell regardless of the temperature of the hydrogen occlusion tank 1.

Also, since the flow rate of hydrogen discharged from the hydrogen occlusion tank 1 is controlled in accordance with the temperature of the hydrogen occlusion tank 1 and the rate of change in the temperature (dT/dt) thereof, the temperature of the hydrogen occlusion tank 1 may quickly reach a desired temperature.

Third Embodiment

Next, a hydrogen supplying device for a fuel cell according to a third embodiment of the present invention will be described. Since the structure of the hydrogen supplying device of the third embodiment is substantially the same as those according to the first and second embodiments, elements which are the same as those in the first and second embodiments are indicated by the same numerals and the explanation thereof will be omitted, and only a hydrogen supplying process to a fuel cell in a travelling mode used in the third embodiment will be explained with reference to flowcharts shown in FIGS. 9A through 9C.

In the third embodiment of the present invention, the hydrogen supplying process is different from that in the first embodiment in the control pattern where the temperature of the hydrogen occlusion alloy is equal to or higher than the lower limit value t1 and equal to or lower than the upper limit value t2, and the rate of change in temperature (dT/dt) is negative. That is, in the control pattern used in the third embodiment of the invention, a maximum amount of hydrogen, which may be discharged from the hydrogen occlusion tank 1 when a maximum quantity of heat suppliable is supplied to the hydrogen occlusion tank 1, is discharged from the hydrogen occlusion tank 1 so that the temperature of the hydrogen occlusion alloy is not substantially changed, and an amount of hydrogen, which cannot be supplied only by the maximum amount of hydrogen discharged from the hydrogen occlusion tank 1, is supplemented by the discharge from the hydrogen tank 19.

Note that in the third embodiment of the present invention, as in the first and second embodiments, the temperature of the hydrogen occlusion tank 1 is controlled to become the set value t0 in the travelling mode (the lower limit value t1<t0<the upper limit value t2).

According to the third embodiment of the invention, since steps S301 through S324 correspond to steps S101 through S124 in the first embodiment and the contents thereof are substantially the same, the explanation of these steps will be omitted and only the process in and after step S325 will be explained.

If it is determined to be "NO" in step S318, i.e., if it is determined that the maximum quantity of heat suppliable is smaller than the maximum quantity of heat required, the process proceeds to step S325. In step S325, the flow rate of hydrogen, which can be discharged from the hydrogen occlusion tank 1 if the maximum quantity of heat suppliable estimated in step S317 is supplied to the hydrogen occlusion tank 1 (hereinafter referred to as a maximum discharging amount of hydrogen), is estimated.

Then, in step S326, the flow rate controlling valves V5 and V6 are completely closed to stop the introduction of an outside air and a cold air through the outside air duct 23 and the cold air duct 25, respectively, and the flow rate controlling valve V4 is fully opened so that outside air to be heated is introduced through the duct 3 to supply only the heated outside air to the hydrogen occlusion tank 1. In this manner, a maximum quantity of heat suppliable may be supplied to the hydrogen occlusion tank 1.

After this, in step S327, the flow rate controlling valve V2 is fully opened, and the process proceeds to step S328. In step S328, the opening degree of the flow rate controlling valve V1 is controlled so that the maximum discharging amount of hydrogen estimated in step S325 may be discharged from the hydrogen occlusion tank 1, and the opening degree of the flow rate controlling valve V3 is controlled so that an amount of hydrogen cannot be supplied from the hydrogen occlusion tank 1 may be supplemented by the discharge from the hydrogen tank 19. That is, the opening degree of the flow rate controlling valves V1 and V3, respectively, is controlled so that the total of the flow rate of hydrogen discharged from the hydrogen occlusion tank 1 and from the hydrogen tank 19 becomes the flow rate of hydrogen required for the fuel cell 7. In this manner, hydrogen discharged from the hydrogen occlusion tank 1 and that discharged from the hydrogen tank 19 are merged in the hydrogen supply line 11, and then supplied to the fuel cell 7.

After this, the process proceeds to step S307. Since the process subsequent to step S307 has already been explained, the explanation thereof will be omitted.

Figure 10:
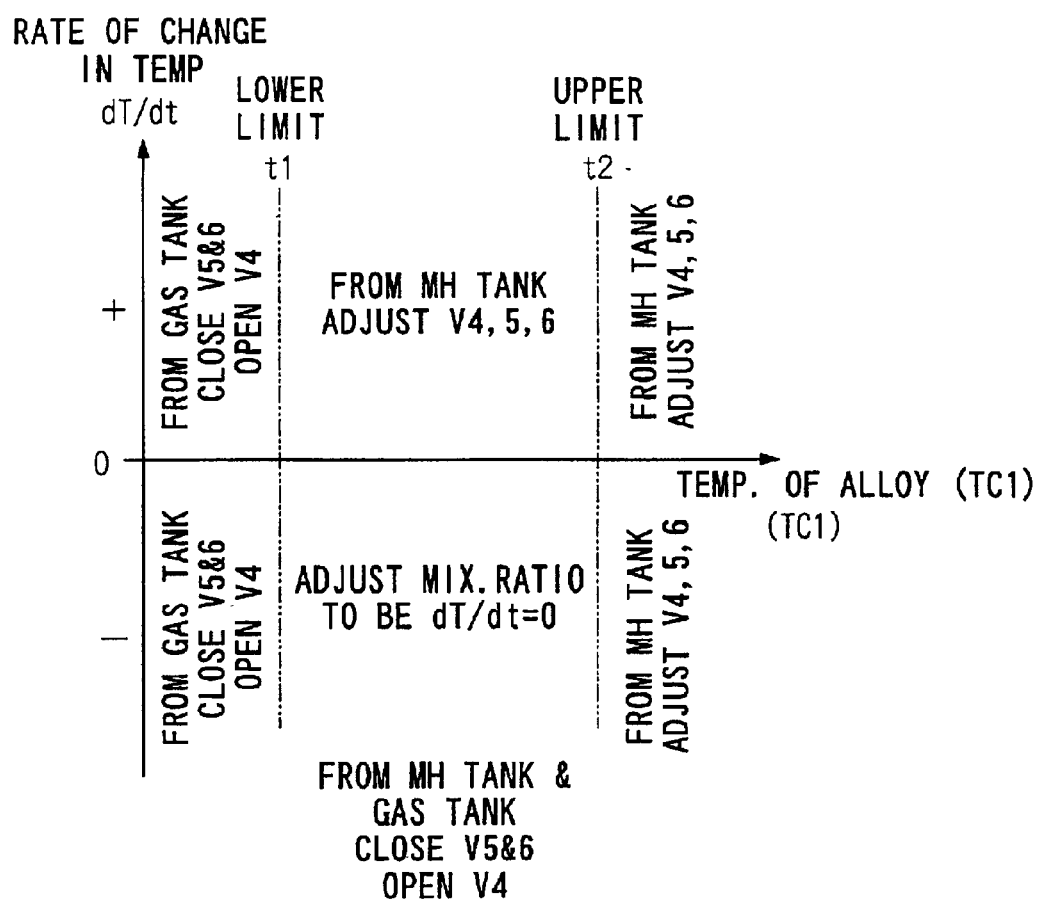
FIG. 10 is a graph showing control patterns used in the hydrogen supplying process according to the third embodiment of the present invention.

FIG. 10 is a graph showing control patterns used in the hydrogen supplying process of the third embodiment of the present invention. In the graph shown in FIG. 10, the rate of change in the temperature (dT/dt) of the hydrogen occlusion alloy is plotted on the longitudinal axis, and the temperature of the hydrogen occlusion alloy is plotted on the transverse axis. This will be explained as follows.

The control patterns are the same as those in the first embodiment for the cases where the temperature of the hydrogen occlusion alloy is: lower than the lower limit value t1; higher than the upper limit value t2; and equal to or higher than the lower limit value t1 and equal to or lower than the upper limit value t2 and the rate of change in temperature (dT/dt) is positive.

That is, when the temperature of the hydrogen occlusion alloy is lower than the lower limit value t1, only hydrogen from the hydrogen tank 19 is supplied to the fuel cell 7 regardless of the rate of change in temperature (dT/dt), and only the outside air, which is introduced via an opening at the upstream end of the duct 3 and is heated by means of the heat exchange tube 5, is supplied to the fuel cell 7 so that the hydrogen occlusion tank 1 may be heated at an early stage.

Also, when the temperature of the hydrogen occlusion alloy is higher than the upper limit value t2, only hydrogen from the hydrogen occlusion tank 1 is supplied to the fuel cell 7 regardless of the rate of change in temperature (dT/dt), and the flow rate controlling valves V4, V5, and V6 are controlled so as to cool down the hydrogen occlusion tank 1. In this manner, the amount of hydrogen discharged from the hydrogen occlusion tank 1 may be increased and an increase in temperature of the hydrogen occlusion tank 1 can be prevented. Accordingly, an increase in the pressure in the hydrogen occlusion tank 1 may also be prevented.

When the temperature of the hydrogen occlusion alloy is equal to or higher than the lower limit value t1 and is equal to or lower than the upper limit value t2 and the rate of change in temperature (dT/dt) is positive, only hydrogen in the hydrogen occlusion tank 1 is supplied to the fuel cell 7, and the flow rate controlling valves V4, V5, and V6 are controlled so that the temperature of air supplied to the hydrogen occlusion tank 1 reaches the target air temperature. In this manner, an increase in the temperature of the hydrogen occlusion tank 1 may be prevented.

In the third embodiment of the present invention, however, when the temperature of the hydrogen occlusion alloy is equal to or higher than the lower limit value t1 and is equal to or lower than the upper, limit value t2 and the rate of change in temperature (dT/dt) is negative, the control pattern differs from that in the first embodiment. That is, in the third embodiment, a maximum discharging amount of hydrogen, which may be discharged when a maximum quantity of heat suppliable is supplied, is discharged from the hydrogen occlusion tank 1 (so that the rate of change in the temperature of the hydrogen occlusion alloy (dT/dt) becomes zero) to be supplied to the fuel cell 7. If an amount of hydrogen required by the fuel cell 7 cannot be sufficiently supplied in the above process, i.e., the maximum discharging amount of hydrogen<the amount of hydrogen required by the fuel cell 7, hydrogen is supplied from the hydrogen tank 19 to the fuel cell 7 so as to supplement the insufficient amount of hydrogen, and only outside air, which is introduced via an opening at the upstream end of the duct 3 and is heated by means of the heat exchange tube 5, is supplied to the fuel cell 7 so as to heat the hydrogen occlusion tank 1. In this manner, it becomes possible to adequately operate the fuel cell 7 and to decrease an energy loss in the system since a sufficient amount of hydrogen is supplied to the fuel cell 7. Also, according to the embodiment of the present invention, the temperature of the hydrogen occlusion tank 1 may be controlled to be a constant temperature. Moreover, it becomes possible to decrease the consumption of hydrogen in the hydrogen tank 19, and hence the capacity or the size of the hydrogen tank 19 may be decreased.

As mentioned above, according to the hydrogen supplying device of the third embodiment of the present invention, it becomes possible to stably supply hydrogen to the fuel cell 7 regardless of the temperature of the hydrogen occlusion tank 1.

Also, since the flow rate of hydrogen supplied from the hydrogen occlusion tank 1 and from the hydrogen tank 19 are controlled in accordance with the temperature of the hydrogen occlusion tank 1 and the rate of change in the temperature thereof (dT/dt), the temperature of the hydrogen occlusion tank 1 may quickly reach a desired temperature.

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A hydrogen supplying device for a fuel cell, comprising:
    a hydrogen occlusion tank in which a hydrogen occlusion alloy is contained, said hydrogen occlusion alloy being capable of occluding and discharging hydrogen which is used as a fuel for said fuel cell:
    a hydrogen tank in which hydrogen to be supplied to said fuel cell can be stored in a compressed state;
    a heating unit which supplies heat to said hydrogen occlusion tank to discharge hydrogen from said hydrogen occlusion alloy;
    a hydrogen supply line through which a flow of hydrogen supplied from said hydrogen occlusion tank and a flow of hydrogen supplied from said hydrogen tank can be merged to be supplied to said fuel cell; and
    a flow rate controlling device which controls a flow rate of hydrogen supplied from said hydrogen occlusion tank and a flow rate of hydrogen supplied from said hydrogen tank, wherein hydrogen is supplied to said fuel cell only from said hydrogen tank when the temperature of said hydrogen occlusion tank is lower than a lower limit temperature and hydrogen is supplied to said fuel cell from said hydrogen occlusion tank when the temperature of said hydrogen occlusion tank is equal to or higher than the lower limit temperature.

2. A hydrogen supplying device for a fuel cell according to claim 1, wherein
    said flow rate controlling device controls the flow rate of hydrogen supplied from said hydrogen occlusion tank and the flow rate of hydrogen supplied from said hydrogen tank depending on the temperature of said hydrogen occlusion tank.

3. A hydrogen supplying device for a fuel cell according to claim 2, wherein
    hydrogen is supplied to said fuel cell only from said hydrogen occlusion tank when the temperature of said hydrogen occlusion tank is higher than an upper limit temperature.

4. A hydrogen supplying device for a fuel cell according to claim 2, wherein
    said flow rate controlling device is controlled depending on a rate of change in the temperature of said hydrogen occlusion tank when the temperature of said hydrogen occlusion tank is equal to or higher than a lower limit temperature and is equal to or lower than a higher limit temperature.

5. A hydrogen supplying device for a fuel cell according to claim 4, wherein
    said flow rate controlling device is controlled so that hydrogen is supplied to said fuel cell only from said hydrogen occlusion tank when the rate of change in the temperature of said hydrogen occlusion tank is increasing, and
    said flow rate controlling device is controlled so that hydrogen is supplied to said fuel cell from both said hydrogen occlusion tank and said hydrogen tank when the rate of change in the temperature of said hydrogen occlusion tank is decreasing.

6. A hydrogen supplying device for a fuel cell according to claim 1, wherein
    said flow rate controlling device is controlled depending on the rate of change in the temperature of said hydrogen occlusion tank.

7. A hydrogen supplying device for a fuel cell according to claim 6, wherein
    said flow rate controlling device controls the flow rate of hydrogen so that the rate of change in temperature of said hydrogen occlusion tank becomes substantially zero.

8. A hydrogen supplying device for a fuel cell according to claim 1, wherein
    said flow rate controlling device is controlled depending on the temperature of said hydrogen occlusion tank and the rate of change in the temperature of said hydrogen occlusion tank.

9. A hydrogen supplying device for a fuel cell comprising:
    a hydrogen occlusion tank in which a hydrogen occlusion alloy is contained, said hydrogen occlusion alloy being capable of occluding and discharging hydrogen which is used as a fuel for said fuel cell;
    a hydrogen tank in which hydrogen to be supplied to said fuel cell can be stored in a compressed state:
    a heating unit which supplies heat to said hydrogen occlusion tank to discharge hydrogen from said hydrogen occlusion alloy:
    a hydrogen supply line through which a flow of hydrogen supplied from said hydrogen occlusion tank and a flow of hydrogen supplied from said hydrogen tank can be merged to be supplied to said fuel cell:
    a flow rate controlling device which controls a flow rate of hydrogen supplied from said hydrogen tank depending on a flow rate of hydrogen supplied from said hydrogen tank depending on a flow rate of hydrogen supplied from said hydrogen occlusion tank, said flow rate controlling device controls the flow rate of hydrogen supplied from said hydrogen tank so that the total of the flow rate of hydrogen supplied from said hydrogen occlusion tank and the flow rate of hydrogen supplied from said hydrogen tank becomes a flow rate of hydrogen required by said fuel cell;

a quantity of heat calculation unit which calculates a quantity of heat for heating said hydrogen occlusion tank by said heating unit; and a maximum discharging amount of hydrogen calculation unit which calculates a maximum amount of hydrogen that can be supplied from said hydrogen occlusion tank, based on the quantity of heat for heating said hydrogen occlusion tank calculated by said quantity of heat calculation unit, wherein said flow rate controlling device controls the flow rate of hydrogen supplied from said hydrogen tank depending on the maximum discharging amount of hydrogen calculated by said maximum discharging amount of hydrogen calculation unit.

10. A hydrogen supplying device for a fuel cell according to claim 9, wherein said flow rate controlling device controls so that hydrogen is not supplied from said hydrogen tank if the maximum discharging amount of hydrogen calculated by said maximum discharging amount of hydrogen calculation unit is sufficient for the flow rate of hydrogen required by said fuel cell.

11. A hydrogen supplying device for a fuel cell, comprising:

a hydrogen occlusion tank in which a hydrogen occlusion alloy is contained, said hydrogen occlusion alloy being capable of occluding and discharging hydrogen which is used as a fuel for said fuel cell;

a heating unit which is used for heating said hydrogen occlusion tank by supplying a heating medium, which has been heated by using waste heat from said fuel cell and whose temperature is controllable, to said hydrogen occlusion tank to discharge hydrogen from said hydrogen occlusion alloy; and a required quantity of heat calculation unit which calculates a quantity of heat required by said hydrogen occlusion tank based on an amount of hydrogen supplied from said hydrogen occlusion tank, wherein said heating unit is controlled depending on the required quantity of heat calculated by said required quantity of heat calculation unit.

12. A hydrogen supplying device for a fuel cell according to claim 11, further comprising:

a target temperature calculation unit which calculates a target temperature of said heating medium based on the temperature of said hydrogen occlusion tank, wherein said heating unit is controlled so that the temperature of said heating medium reaches the target temperature.

13. A hydrogen supplying device for a fuel cell according to claim 12, wherein the target temperature of said heating medium is corrected based on a quantity of heat required by said heating unit for heating said hydrogen occlusion tank and the required quantity of heat calculated by said required quantity of heat calculation unit.

14. A hydrogen supplying device for a fuel cell according to claim 13, wherein the rate of change in the temperature of said hydrogen occlusion tank is calculated based on the quantity of heat required by said heating unit and the required quantity of heat calculated by said required quantity of heat calculation unit, and a target temperature is corrected to be higher than the target temperature calculated by said target temperature calculation unit if the rate of change in the temperature of said hydrogen occlusion tank is decreasing, and a target temperature is corrected to be lower than the target temperature calculated by said target temperature calculation unit if the rate of change in the temperature of said hydrogen occlusion tank is increasing.

* * * * *